United States Patent
Hannun et al.

(10) Patent No.: US 11,562,733 B2
(45) Date of Patent: *Jan. 24, 2023

(54) DEEP LEARNING MODELS FOR SPEECH RECOGNITION

(71) Applicant: BAIDU USA LLC, Sunnyvale, CA (US)

(72) Inventors: Awni Hannun, Palo Alto, CA (US); Carl Case, San Francisco, CA (US); Jared Casper, Sunnyvale, CA (US); Bryan Catanzaro, Cupertino, CA (US); Gregory Diamos, San Jose, CA (US); Erich Eisen, Mountain View, CA (US); Ryan Prenger, Oakland, CA (US); Sanjeev Satheesh, Sunnyvale, CA (US); Shubhabrata Sengupta, Menlo Park, CA (US); Adam Coates, Sunnyvale, CA (US); Andrew Ng, Mountain View, CA (US)

(73) Assignee: BAIDU USA LLC, Sunnyvale, CA (US)

(*) Notice: Subject to any disclaimer, the term of this patent is extended or adjusted under 35 U.S.C. 154(b) by 242 days.

This patent is subject to a terminal disclaimer.

(21) Appl. No.: 16/542,243

(22) Filed: Aug. 15, 2019

(65) Prior Publication Data
US 2019/0371298 A1 Dec. 5, 2019

Related U.S. Application Data

(62) Division of application No. 14/735,002, filed on Jun. 9, 2015, now Pat. No. 10,540,957.
(Continued)

(51) Int. Cl.
*G10L 15/06* (2013.01)
*G10L 15/26* (2006.01)
(Continued)

(52) U.S. Cl.
CPC .......... *G10L 15/063* (2013.01); *G06N 3/0445* (2013.01); *G06N 3/0454* (2013.01);
(Continued)

(58) Field of Classification Search
CPC ....... G10L 15/063; G10L 15/16; G10L 15/26; G06N 3/0445; G06N 3/0454; G06N 3/084
(Continued)

(56) References Cited

U.S. PATENT DOCUMENTS 5,640,490 A * 6/1997 Hansen .................... G10L 15/10
704/270.1
5,864,803 A ‡ 1/1999 Nussbaum ............ G10L 15/063
704/23
(Continued)

FOREIGN PATENT DOCUMENTS

CN 103591637 A ‡ 2/2014
CN 103591637 A 2/2014
(Continued)

OTHER PUBLICATIONS

A neural Network ensemble method with jitted training data for time series forecasting G. Peter Zhang (Year: 2007).*
(Continued)

*Primary Examiner* — Akwasi M Sarpong
(74) *Attorney, Agent, or Firm* — North Weber & Baugh LLP

(57) ABSTRACT

Presented herein are embodiments of state-of-the-art speech recognition systems developed using end-to-end deep learning. In embodiments, the model architecture is significantly simpler than traditional speech systems, which rely on laboriously engineered processing pipelines; these traditional systems also tend to perform poorly when used in noisy environments. In contrast, embodiments of the system
(Continued)

do not need hand-designed components to model background noise, reverberation, or speaker variation, but instead directly learn a function that is robust to such effects. Neither a phoneme dictionary, nor even the concept of a "phoneme," is needed. Embodiments include a well-optimized recurrent neural network (RNN) training system that can use multiple GPUs, as well as a set of novel data synthesis techniques that allows for a large amount of varied data for training to be efficiently obtained. Embodiments of the system can also handle challenging noisy environments better than widely used, state-of-the-art commercial speech systems.

20 Claims, 14 Drawing Sheets

Related U.S. Application Data

(60) Provisional application No. 62/093,057, filed on Dec. 17, 2014, provisional application No. 62/092,251, filed on Dec. 15, 2014.

(51) Int. Cl.
  *G10L 15/16* (2006.01)
  *G06N 3/04* (2006.01)
  *G06N 3/08* (2006.01)

(52) U.S. Cl.
  CPC .............. *G06N 3/084* (2013.01); *G10L 15/16* (2013.01); *G10L 15/26* (2013.01)

(58) Field of Classification Search
  USPC .................................. 704/235, 244, 260, 232
  See application file for complete search history.

(56) References Cited

U.S. PATENT DOCUMENTS

| | | | | |
|---|---|---|---|---|
| 6,021,387 A ‡ | 2/2000 | Mozer et al. | ........... | G10L 15/16 704/23 |
| 6,292,772 B1 ‡ | 9/2001 | Kantrowitz | ........... | G06F 17/275 382/23 |
| 6,446,040 B1 * | 9/2002 | Socher | .................. | G10L 13/027 704/260 |
| 6,490,553 B2 * | 12/2002 | Van Thong | ............ | H04N 5/278 704/211 |
| 7,035,802 B1 ‡ | 4/2006 | Rigazio | ................. | G06F 16/322 704/25 |
| 8,527,276 B1 * | 9/2013 | Senior | .................... | G06N 3/084 704/258 |
| 9,153,231 B1 * | 10/2015 | Salvador | ................. | G10L 15/16 |
| 9,418,334 B2 * | 8/2016 | Sainath | .................... | G06N 3/08 |
| 9,984,682 B1 * | 5/2018 | Tao | ........................ | G09B 19/04 |
| 10,380,997 B1 * | 8/2019 | Ward | ........................ | G06N 3/08 |
| 2003/0110033 A1 ‡ | 6/2003 | Sheikhzadeh-Nadjar | .................. G10L 15/34 704/24 |
| 2003/0236672 A1 ‡ | 12/2003 | Aaron | ..................... | G10L 15/01 704/27 |
| 2004/0049386 A1 * | 3/2004 | Niemoeller | ............. | G10L 15/30 704/E15.047 |
| 2005/0114118 A1 * | 5/2005 | Peck | ........................ | G10L 25/87 704/E11.005 |
| 2006/0031069 A1 ‡ | 2/2006 | Huang | .................... | G10L 13/08 704/24 |
| 2006/0217968 A1 ‡ | 9/2006 | Burges | .................. | G06K 9/4647 704/20 |
| 2006/0229865 A1 ‡ | 10/2006 | Carlgren et al. | ...... | G06F 17/275 704/8 |
| 2007/0106507 A1 ‡ | 5/2007 | Charoenruengkit | .... | G10L 15/20 704/23 |
| 2010/0002333 A1 ‡ | 1/2010 | Duta | ..................... | G10L 15/063 704/25 |
| 2010/0023331 A1 ‡ | 1/2010 | Duta et al. | ............ | G10L 15/063 704/25 |
| 2011/0035215 A1 * | 2/2011 | Sompolinsky | .......... | G10L 15/04 704/E15.001 |
| 2011/0087491 A1 * | 4/2011 | Wittenstein | ............. | G10L 15/26 704/235 |
| 2011/0112832 A1 * | 5/2011 | Prorock | ................. | G11B 27/36 704/E15.044 |
| 2011/0173208 A1 ‡ | 7/2011 | Vogel | ..................... | G10L 25/48 707/74 |
| 2011/0282663 A1 * | 11/2011 | Talwar | .................... | G10L 15/20 704/233 |
| 2012/0065976 A1 * | 3/2012 | Deng | ..................... | G06N 3/084 704/256.1 |
| 2012/0072215 A1 * | 3/2012 | Yu | ........................ | G06K 9/6296 704/240 |
| 2012/0194737 A1 * | 8/2012 | Cafarella | ................ | G10L 25/48 348/E9.034 |
| 2013/0317755 A1 ‡ | 11/2013 | Mishra | .................... | G16B 30/00 702/20 |
| 2014/0025376 A1 * | 1/2014 | Wasserblat | ............. | G10L 25/51 704/238 |
| 2014/0257803 A1 * | 9/2014 | Yu | .......................... | G10L 15/16 704/232 |
| 2014/0257805 A1 * | 9/2014 | Huang | .................... | G06N 3/084 704/232 |
| 2015/0088508 A1 ‡ | 3/2015 | Bharadwaj et al. | .. | G10L 15/063 704/23 |
| 2015/0186756 A1 ‡ | 7/2015 | Fujii | ........................ | G06K 9/72 382/22 |
| 2015/0269933 A1 ‡ | 9/2015 | Yu | ............................ | G10L 15/16 704/23 |
| 2015/0279349 A1 * | 10/2015 | Byron | .................... | G10L 13/033 704/260 |
| 2015/0309987 A1 ‡ | 10/2015 | Epstein | ............... | G06F 17/2765 704/9 |
| 2016/0321777 A1 ‡ | 11/2016 | Jin | ........................ | G06F 9/5016 |
| 2017/0103752 A1 ‡ | 4/2017 | Senior | ..................... | G10L 15/16 |

FOREIGN PATENT DOCUMENTS

| | | | | |
|---|---|---|---|---|
| EP | 0865030 A2 ‡ | 9/1998 | ............. | G10L 15/16 |
| EP | 0865030 A2 | 9/1998 | | |
| JP | 2001084236 A | 3/2001 | | |
| JP | 2005182785 A | 7/2005 | | |
| JP | 2009210829 A | 9/2009 | | |
| JP | 2010123072 A | 6/2010 | | |

OTHER PUBLICATIONS

Generating Sequences With Recurrent Neural Networks (Alex Graves) (Year: 2014).*
J. Dean et al., "Large scale distributed deep networks," In Advances in Neural Information Processing Systems 25, 2012 (97pgs).‡
D. Ellis et al., "Size matters: An empirical study of neural network training for large vocabulary continuous speech recognition," In ICASSP 2:1013-1016, IEEE 1999 (4pgs).‡
E. Elsen, "Optimizing RNN performance," http://svail.github.io/rnn_perf. Accessed: Nov. 24, 2015 (18pgs). M. J. Gales et al., "Support vector machines for noise robust ASR," In ASRU, pp. 205-2010, 2009 (4pgs).‡
A. Graves et al., "Connectionist temporal classification: Labelling unsegmented sequence data with recurrent neural networks," In ICML, pp. 369-376. ACM, 2006 (8pgs).‡
A. Graves et al., "Towards end-to-end speech recognition with recurrent neural networks," In ICML, 2014 (9pgs).‡
A. Graves et al., "Speech recognition with deep recurrent neural networks," In ICASSP, 2013 (5pgs).‡
H. H. Sak et al., "Long short-term memory recurrent neural network architectures for large scale acoustic modeling," In Interspeech, 2014 (5pgs).‡
A. Hannun et al., "Deep speech: Scaling up end-to-end speech recognition," 1412.5567, 2014. http://arxiv.org/abs/1412.5567 (12pgs).‡

(56) References Cited

OTHER PUBLICATIONS

A.Y. Hannun et al., "First-pass large vocabulary continuous speech recognition using bi-directional recurrent DNNs," abs/1408.2873, 2014. http://arxiv.org/abs/1408.2873, 7pgs.‡
International Search Report dated Apr. 22, 2016, in International Patent Application No. PCT/US15/65617, filed Dec. 14, 2015 (4pgs).‡
Written Opinion dated Apr. 22, 2016, in International Patent Application No. PCT/US15/65617, filed Dec. 14, 2015 (6pgs).‡
Maas et al., "Increasing deep neural network acoustic model size for large vocabulary continuous speech recognition," 2014, http://arxiv.org/abs/1406.7806 (5pgs).‡
K. Heafield et al., "Scalable modified Kneser-Ney language model estimation," In Proceedings of the 51st Annual Meeting of the Association for Computational Linguistics, Sofia, Bulgaria, 8 2013 (7pgs).‡
G. Hinton et al., "Deep neural networks for acoustic modeling in speech recognition," IEEE Signal Processing Magazine, Nov. 29:82-97, 2012 (27pgs). S. Hochreiter et al., "Long short-term memory," Neural Computation, 9(8):1735 1780, 1997 (32pgs).‡
N. Jaitly et al.,"Vocal tract length perturbation (VTLP) improves speech recognition," In ICML Workshop on Deep Learning for Audio, Speech, and Language Processing, 2013, 5pp.‡
R. Jozefowicz et al., "An empirical exploration of recurrent network architectures," In ICML, 2015 (9pgs).‡
O. Kapralova et al., "A big data approach to acoustic model training corpus selection," In Interspeech, 2014 (5pgs).‡
K.Knowlton, "A fast storage allocator". Commun. ACM, 8(10):623-624, Oct. 1965 (3pgs).‡
T. Ko et al., Audio augmentation for speech recognition. In Interspeech, 2015 (4pgs).‡
R. Pascanu et al., "On the difficulty of training recurrent neural networks," abs/1211.5063, 2012, http://arxiv.org/abs/1211.5063 (9pgs).‡
P. Patarasuk et al., "Bandwidth optimal all-reduce algorithms for clusters of workstations," J. Parallel Distrib. Comput., 69(2):117-124, Feb. 2009 (24pgs).‡
R. Raina et al., "Large-scale deep unsupervised learning using graphics processors," In 26th International Conference on Machine Learning, 2009 (8pgs). S. Renals et al., "Connectionist probability estimators in HMM speech recognition," IEEE Transactions on Speech and Audio Processing, 2(1):161-174, 1994 (13pgs).‡
T. Robinson et al., "The use of recurrent neural networks in continuous speech recognition," pp. 253-258, 1996 (26pgs).‡
T. Sainath et al., "Convolutional, long short-term memory, fully connected deep neural networks," In ICASSP, 2015 (5pgs).‡
T.N. Sainath et al, "Deep convolutional neural networks for LVCSR," In ICASSP, 2013 (5pgs).‡
H. Sak et al., "Fast and accurate recurrent neural network acoustic models for speech recognition," abs/1507.06947, 2015. http://arxiv.org/abs/1507.06947 (5pgs).‡
H. Sak et al., "Sequence discriminative distributed training of long shortterm memory recurrent neural networks," In Interspeech, 2014 (5pgs).‡
B. Sapp et al., "A fast data collection and augmentation procedure for object recognition," In AAAI Twenty-Third Conference on Artificial Intelligence, 2008 (7pgs).‡
C. Laurent et al., "Batch normalized recurrent neural networks," abs/1510.01378, 2015. http://arxiv.org/abs/1510.01378 (9pgs).‡
Q. Le et al., "Building high-level features using large scale unsupervised learning," In International Conference on Machine Learning, 2012 (11 pgs).‡
Y. LeCun et al., "Learning methods for generic object recognition with invariance to pose and lighting," In Computer Vision and Pattern Recognition, 2:97-104, 20004 (8pgs) A. Maas et al., "Lexicon-free conversational speech recognition with neural networks," In NAACL, 2015 (10pgs).‡
Y. Miao et al., "EESEN: End-to-end speech recognition using deep rnn models and wfst-based decoding," In ASRU, 2015 (8pgs).‡
A. Mohamed et al., "Acoustic modeling using deep belief networks," IEEE Transactions on Audio, Speech, and Language Processing, (99), 2011 (10pgs).‡
A.S.N. Jaitly et al., "Application of pretrained deep neural networks to large vocabulary speech recognition," In Interspeech, 2012 (11 pgs).‡
Nervana Systems. Nervana GPU, https://github.com/NervanaSystems/nervanagpu, Accessed: Nov. 6, 2015 (5pgs).‡
J. Niu, "Context-dependent deep neural networks for commercial mandarin speech recognition applications," In APSIPA, 2013 (5pgs).‡
V. Panayotov et al., "Librispeech: an asr corpus based on public domain audio books," In ICASSP, 2015 (5pgs).‡
O. Abdel-Hamid et al., "Applying convolutional neural networks concepts to hybrid nn-hmm model for speech recognition," In ICASSP, 2012 (4pgs).‡
D. Bahdanau et al., "Neural machine translation by jointly learning to align and translate," In ICLR, 2015 (15pgs).‡
D. Bahdanau et al., "End-to-end attention-based large vocabulary speech recognition." abs/1508.04395, 2015. http://arxiv.org/abs/1508.04395 (8pgs). J. Barker et al., The third 'CHiME' speech separation and recognition challenge: Dataset, task and baselines. 2015. Submitted to IEEE 2015 Automatic Speech Recognition and Understanding Workshop (ASRU) (9pgs).‡
S. Baxter, "Modern GPU," https://nvlabs.github.io/moderngpu/ (3pgs).‡
Y. Bengio et al., "Curriculum learning," In International Conference on Machine Learning, 2009 (8pgs).‡
H. Bourlard et al., "Connectionist Speech Recognition: A Hybrid Approach," Kluwer Academic Publishers, Norwell, MA, 1993 (291 pgs).‡
W. Chan et al., "Listen, attend, and spell," abs/1508.01211, 2015, http://arxiv.org/abs/1508.01211 (16pgs).‡
Chetlur et al., "cuDNN: Efficient primitives for deep learning," (9pgs).‡
Herve Bourlard et al., "Connectionist Speech Recognition a Hybrid Approach," Kluwer Academic Pubishers, ISBN 0-7923-9396-1, 1994 (291 pgs).‡
Sharon Chetlur et al., "cuDNN: Efficient Primitives for Deep Learning," arXiv:1410.0759v3 [cs.NE] Dec. 18, 2014 (9pgs).‡
Christopher Cieri et al., "The Fisher Corpus: a Resource for the Next Generations of Speech-to-Text," University of Pennsylvania, Linguistic Data Consortium (3pgs).‡
Dan C. Ciresan et al., "Flexible, High Performance Convulutional Neural Networks for Image Classification," Proceedings of the 22nd International Joint Conference on Artificial Intelligence, IDSIA, USI and SUPSI, Galleria 2, 6928 Manno-Lugano, OH (6pgs).‡
Dan Ciresan et al., "Multi-column Deep Neural Networks for Image Classification," DSIA, USI and SUPSI, Galleria 2, 6928 Manno-Lugano, CH (8pgs).‡
Adam Coates et al., "Text Detection and Character Recognition in Scene Images with Unsupervised Feature Learning," Computer Science Department, Stanford University, CA (6pgs).‡
Adam Coates ct al., "Deep learning with COTS HPC systems," Proceedings of the 30th International Conference on Machine Learning, Atlanta, GA, 2013. JMLR:W&CP vol. 28 (9pgs).‡
Adam Coates, "An Analysis of Single-Layer Networks in Unsupervised Feature Learning," Stanford University and University of Michigan (9pgs).‡
George E. Dahl et al., "Context-Dependent Pre-Trained Deep Neural Networks for Large-Vocabulary Speech Recognition," IEEE Transactions on Audio, Speech, and Language Processing, 20(1), 1558-7916, 2011, IEEE (13pgs).‡
Jeffrey Dean et al., "Large Scale Distributed Deep Networks," Google, Inc., Mountain View, CA (11 pgs).‡
Dan Ellis et al., "Size Matters: An Empirical Study of Neural Network T raining for Large Vocabulary Continuous Speech Recognition," International Computer Science Institute and University of California at Berkeley, EECS Department, Berkeley, CA (4pgs).‡
Xavier Glorot et al., "Deep Sparse Rectifier Neural Networks," Appearing in Proceedings of the 14th International Conference on Artificial Intelligence and Statistics (AISTATS), Fort Lauderdale, FL, vol. 15 of JMLR:VV&CP 15, 2011 (9pgs).‡
Alex Graves, "Connectionist Temporal Classification: Labelling Unsegmented Sequence Data with Recurrent Neural Networks,"

(56) References Cited

OTHER PUBLICATIONS

Appearing in Proceedings of the 23rd International Conference on Machine Learning, Pittsburgh, PA, 2006 (8pgs).‡
Alex Graves et al., "Towards End-to-End Speech Recognition with Recurrent Neural Networks," Proceedings of the 31st International Conference on Machine Learning, Beijing, CN, 2014. JMLR: W&CP vol. 32 (9pgs).‡
Roger Grosse, "Shift-invariant Sparse Coding for Audio Classification," Stanford University., CA (1 Opgs).‡
Awni Hannun et al., "First-Pass Large Vocabulary Continuous Speech Recognition using Bi-Directional Recurrent DNNs," Stanford University, CA (7pgs).‡
Kenneth Heafield et al., "Scalable Modified Kneser-Ney Language Model Estimation," University of Edinburgh, Carnegie Mellon University, and Yandex (7pgs).‡
Geoffrey Hinton et al., "Deep Neural Networks for Acoustic Modeling in Speech Recognition," Apr. 27, 2012 (27pgs).‡
G.E. Hinton et al., "Improving neural networks by preventing co-adaptation of feature detectors," Jul. 3, 2012, arXiv:1207.0580v1 (cs.NE) (18pgs).‡
David R. Kincaid et al., "ITPACKV 2D User's Guide," May 1989, CNA-232, Gray Research, Inc., Department of Energy, National Science Foundation, with the University of Texas at Austin (14pgs).‡
Alex Krizhevsky et al. "ImageNet Classification with Deep Convolutional Neural Networks," University of Toronto, CA (9pgs).‡
Quoc V. Le et al., "Building High-level Features Using Large Scale Unsupervised Learning," Appearing in Proceedings of the 29th International Conference on Machine Learning, Edinburgh, Scotland, UK, 2012 (11pgs).‡
Y. Lecun et al., "Backpropagation Applied to Handwritten Zip Code Recognition," AT&T Bell Laboratories, Holmdel, NJ, Neural Computation 1(541-551), 1989 (11pgs).‡
Yann Lecun et al., "Learning Methods for Generic Object Recognition with Invariance to Pose and Lighting," (8pgs).‡
Honglak Lee et al., "Unsupervised feature learning for audio classification using convolution deep belief networks," Computer Science Dept., Stanford University, CA (9pgs).‡
Andrew L. Maas et al., "Building DNN Acoustic Models for Large Vocabulary Speech Recognition," Department of Computer Science, Stanford University arXiv:1406.7806v2 [cs.CL] Jan. 20, 2015 (22pgs).‡
Andrew L. Maas et al., "Rectifier Nonlinearities Improve Neural Network Acoustic Models," Proceedings of the 30th International Conference on Machine Learning, Atlanta, GA, 2013, JMLR: W&CP vol. 28 (6pgs).‡
Abdel-Rahman Mohamed et al., "Acoustic Modeling using Deep Belief Networks," 2010, submitted to IEEE Trans. on Audio, Speech, and Language Processing (10pgs).‡
Vinod Nair et al., "Rectified Linear Units Improve Restricted Boltzmann Machines," Appearing in Proceedings of the 27th International Conference on Machine Learning, Haifa, Israel, 2010 (8pgs).‡
Daniel Povey et al., "The Kaldi Speech Recognition Toolkit," (4pgs).‡
Rajat Raina et al., "Large-scale Deep Unsupervised Learning using Graphics Processors," Appearing in Proceedings of the 26th International Conference on Machine Learning, Montreal, Canada, 2009 (8pgs).‡
Steve Renals et al., "Connectionist Probability Estimators in HMM Speech ReCognition," (13pgs).‡
Tara N. Sainath et al., "Improvements to Deep Convolutional Neural Networks for LVCSR," IBM T.J. Watson Research Center, Yorktown Heights, NY, and Dept. of Computer Science, University of Toronto, (6pgs).‡
Tara N. Sainath et al., "Deep Convolutional Neural Networks for LVCSR," IBM T.J. Watson Research Center, Yorktown Heights, NY, and Dept. of Computer Science, University of Toronto (5pgs).‡
Benjamin Sapp et al., A Fast Data Collection and Augmentation Procedure for Object Recognition, Proceedings of the 23rd AAAI Conference on Artificial Intelligence, 2008,7pgs.‡
Mike Schuster et al., "Bidirectional Recurrent Neural Networks," IEEE Transactions on Signal Processing, 45(11):2673-2681, Nov. 1997, 1053-587X/97 (9pgs).‡
Frank Seide et al., "Feature Engineering in Context-Dependent Deep Neural Networks for Conversational Speech Transcription," 978-1-4673-0367-5/11, IEEE (6pgs).‡
Hagen Soltau et al, "Joint Training of Convolutional and Non-Convolutional Neural Networks," 2014 IEEE International Conference on Acoustic, Speech and Signal Processing (ICASSP), pp. 5609-5613, 978-1-4799-2893-4/14 (5pgs).‡
Ilya Sutskever et al., "On the importance of initialization and momentum in deep learning," Proceedings of the 30th International Conference on Machine Learning, Atlanta, GA, 2013. JMLR: W&CP vol. 28. (14pgs).‡
Ilya Sutskever et al., "Sequence to Sequence Learning with Neural Networks," Google, Inc., Mountain View, CA (9pgs).‡
Christian Szegedy et al., "Going deeper with convolutions," Google, Inc., Mountain View, CA, University of North Carolina, Chapel Hill, and University of Michigan (12pgs).‡
Karel Vesely et al., "Sequence-discriminitive training of deep neural networks," Brno Univeristy of Technology, University of Edinburgh, Johns Hopkins Univeristy (5pgs).‡
J.-C. Junqua, "The Lombard reflex and its role on human listeners and automatic speech recognizers," Journal of Acoustical Society of America, 1993 (Abstract Only) (1 pg).‡
B. Kingsbury, et al., Scalable ninimum Bayes risk training of deep neural network acoustic models using distrubuted hessian-free optimization. In Interspeech, 2012 (9pgs).‡
Laurent et al., "Batch Normalized Recurrent Neural Networks," Oct. 5, 2015, URL<https://arxiv.org/pdf/1510.01378.pdf>, (9 pgs).‡
Sak et al. "Learning acoustic frame labeling for speech recognition with recurrent neural networks." Acoustics, Speech and Signal Processing (ICASSP), 2015 IEEE International Conference on. IEEE, 2015, (5 pgs).‡
Graves et al. "Connectionist temporal classification: labelling unsegmented sequence data with recurrent neural networks." Proceedings of the 23rd international conference on Machine learning. ACM, 2006, (8 pgs).‡
Peddinti et al. "A time delay neural network architecture for efficient modeling of long temporal contexts." INTERSPEECH. 2015, (5 pgs).‡
Collobert et al. "A unified architecture for natural language processing: Deep neural networks with multitask learning." Proceedings of the 25th international conference on Machine learning. ACM, 2008, (8 pgs).‡
Non-Final Office Action dated Feb. 1, 2018, in U.S. Appl. No. 15/358,102, (39 pgs).‡
Response filed Jul. 2, 2018, in U.S. Appl. No. 15/358,102, (30 pgs).‡
Non-Final Office Action dated Feb. 1, 2018, in U.S. Appl. No. 15/358,083, (41 pgs).‡
Response filed Jul. 2, 2018, in U.S. Appl. No. 15/358,083, (29 pgs).‡
Final Office Action dated Aug. 27, 2018, in U.S. Appl. No. 15/358,102, (55 pgs).‡
Response filed Nov. 19, 2018, in U.S. Appl. No. 15/358,102, (11 pgs).‡
Final Office Action dated Nov. 2, 2018, in U.S. Appl. No. 15/358,083, (21 pgs).‡
Response to Final Office Action filed Dec. 19, 2018, in U.S. Appl. No. 15/358,083, (8 pgs).‡
Sak et al.,"Fast and Accurate Recurrent Neural Network Acoustic Models for Speech Recognition." arXiv preprint arXiv: 1507.06947. Jul. 24, 2015, (5 pgs).‡
Balkir et al. "A distributed look-up architecture for text mining applications using mapreduce." Proceedings of 2011 International Conference for High Performance Computing, Networking, Storage and Analysis. ACM, 2011, (11 pgs).‡
Chen et al. "Berkeley at NTCIR-2: Chinese, Japanese, and English IR experiments." NTCIR. 2001, (9 pgs).‡
Notice of Allowance and Fee Due, dated Feb. 14, 2019, in U.S. Appl. No. 15/358,102, (10 pgs).‡

(56) References Cited

OTHER PUBLICATIONS

Notice of Allowance and Fee Due, dated Jan. 28, 2019, in U.S. Appl. No. 15/358,083, (10 pgs).‡
International Search Report dated Mar. 24, 2017, in International Patent Application No. PCT/US16/63661, filed Nov. 23, 2016, (15 pgs).‡
Written Opinion dated Mar. 24, 2017, in International Patent Application No. PCT/US16/63661, filed Nov. 23, 2016, (6 pgs).‡
International Search Report dated Feb. 7, 2017, in International Patent Application No. PCT/US16/63641, filed Nov. 23, 2016, (10 pgs).‡
Written Opinion dated Feb. 7, 2017, in International Patent Application No. PCT/US16/63641, filed Nov. 23, 2016, (7 pgs).‡
Gibiansky, A., "Speech Recognition With Neural Networks"; Machine-Learning; Publication. Apr. 23, 2014, <URL: http://andrew.gibiansky.com/blog/machine-learning/speech-recognition-neural-networks/>; pp. 1-20, (20 pgs).‡
"Notification Concerning Transmittal of International Preliminary Report on Patentability" dated Jun. 29, 2017, in International Patent Application No. PCT/US2015/065617, filed Dec. 14, 2015, (1pg).‡
"International Preliminary Report on Patentability" dated Jun. 20, 2017 in International application No. PCT/US2015/065617, filed Dec. 14, 2015, (7 pgs).‡
E. Elsen, "Optimizing RNN performance," http://svail.github.io/rnn_perf. Accessed: Nov. 24, 2015 (18pgs).
M. J. Gales et al., "Support vector machines for noise robust ASR," In ASRU, pp. 205-2010, 2009 (4pgs).
Chetlur et al., "cuDNN: Efficient Primitives for Deep Learning," arXiv:1410.0759v3 [cs.NE] Dec. 18, 2014 (9pgs).
Cieri et al., "The Fisher Corpus: a Resource for the Next Generations of Speech-to-Text," University of Pennsylvania, Linguistic Data Consortium, 2004 (3pgs).
Ciresan et al., "Flexible, High Performance Convulutional Neural Networks for Image Classification," Proc. of the 22nd Int'l Joint Con. on Artificial Intelligence, 2011 (6pgs).
Ciresan et al., "Multi-column Deep Neural Networks for Image Classification," DSIA, USI and SUPSI, Galleria 2, 6928 Manno-Lugano, 2012 (8pgs).
Adam Coates et al.,"Text Detection and Character Recognition in Scene Images with Unsupervised Feature Learning,"Computer Science Department, Stanford University, 2011 (6pgs).
Coates et al., "Deep learning with COTS HPC systems," Proceedings of the 30th International Conference on Machine Learning, Atlanta, GA, 2013. JMLR:W&CP vol. 28 (9pgs).
Coates, "An Analysis of Single-Layer Networks in Unsupervised Feature Learning," Stanford University & University of Michigan, 2011 (9pgs).
Dahl et al.,"Context-Dependent Pre-Trained Deep Neural Networks for Large-Vocabulary Speech Recognition,"IEEE Transactions on Audio, Speech, & Language Processing, 2011(13pgs).
Maas et al.,"Increasing deep neural network acoustic model size for large vocabulary continuous speech recognition," abs/1406.7806, 2014. http://arxiv.org/abs/1406.7806 (5pgs).
Maas et al.,"Rectifier Nonlinearities Improve Neural Network Acoustic Models," Proc of the 30th Int'l Con on Machine Learning, 2013, JMLR: W&CP vol. 28 (6pgs).
Mohamed et al., "Acoustic Modeling using Deep Belief Networks," 2010, submitted to IEEE Trans. on Audio, Speech, and Language Processing (10pgs).
Raina et al.,"Large-scale Deep Unsupervised Learning using Graphics Processors," Appearing in Proc of the 26th Int'l Con on Machine Learning, Montreal, Canada, 2009 (8pgs).
Nair et al.,"Rectified Linear Units Improve Restricted Boltzmann Machines," Appearing in Proc of the 27th Int'l Con on Machine Learning, Israel, 2010 (8pgs).
Renals et al.,"Connectionist Probability Estimators in HMM Speech Recognition," IEEE Transactions on Speech and Audio Processing, 2(1):161-174, 1994. (13pgs).
Povey et al., "The Kaldi Speech Recognition Toolkit," In ASRU, 2011 (4pgs).

Sainath et al.,"Improvements to Deep Convolutional Neural Networks for LVCSR,"IBM T.J. Watson Research Center,Yorktown Heights, NY, & Dept. of Computer Science, University of Toronto, 2013 (6pgs).
Sainath et al.,"Deep Convolutional Neural Networks for LVCSR,"IBM T.J.Watson Research Center,Yorktown Heights & Dept. of Computer Science, University of Toronto, 2013 (5pgs).
Y. LeCun et al., "Learning methods for generic object recognition with invariance to pose and lighting," In Computer Vision and Pattern Recognition, 2:97-104, 20004 (8pgs).
A. Maas et al., "Lexicon-free conversational speech recognition with neural networks," In NAACL, 2015 (10pgs).
Ariga Kazuya, "Synonymous-words extension of the word according to the context by vector expression of a word," Mar. 9, 2015, Japan. (6 pgs).
Shouhei Hido, "Data scientist training reader machine learning edited for beginners," Oct. 10, 2015, Japan. (17 pgs).
M. Miyatake et al., "Training Methods and Their Effects for Spotting Japanese Phonemes Using Time-Delay Neural Networks," 1998. (9 pgs).
Lee & Hon,"Large-vocabulary speaker independent continuous speech recognition using HMM," In Acoustics, Speech, and Signal Processing, 1988. (6 pgs).
Doss et al.,"Phoneme-Grapheme based speech recognition system," In Automatic Speech Recognition and Understanding, 2003. (10 pgs).
Lieberman et al.,"How to wreck a nice beach you sing calm incense," Proceedings of the 10th intenational confrencce in Intelligent user interface, ACM, 2005. (2pgs).
Porter et al.,"Optimal estimators for spectral restoration of noisy speech," In Acoustics, Speech, & Signal Processing, IEEE Intr. Conference on ICASSP 1984. (2 pgs).
Bahdanau et al.,"Neural machine translation by jointly learning to align and translate," abs/1409.0473, 2014. http://arxiv.org/abs/1409.0473. (15 pgs).
Hinton et al., "Deep Neural Networks for Acoustic Modeling in Speech Recognition," Apr. 27, 2012 (27pgs).
Hinton et al., "Improving neural networks by preventing co-adaptation of feature detectors," Jul. 3, 2012, arXiv:1207.0580v1 (cs.NE) (18pgs).
Kincaid et al., "ITPACKV 2D User's Guide," May 1989, CNA-232, Gray Research, Inc., Department of Energy, National Science Foundation, with the University of TX, (14pgs).
Kingsbury et al.,"Scalable minimum Bayes risk training of deep neural network acoustic models using distributed hessian-free optimization," In Interspeech, 2012. (4pgs).
Le et al.,"Building High-level Features Using Large Scale Unsupervised Learning," Appearing in Proc of the 29th Int'l Conference on Machine Learning, 2012 (11pg).
Lecun et al., "Backpropagation Applied to Handwritten Zip Code Recognition," AT&T Bell Laboratories, Holmdel, NJ, Neural Computation 1(541-551), 1989 (11pgs).
Lecun et al.,"Learning Methods for Generic Object Recognition with Invariance to Pose and Lighting," In Computer Vision & Pattern Recognition, 2004 (8pgs).
Lee et al., "Unsupervised feature learning for audio classification using convolution deep belief networks," Computer Science Dept., Stanford University, 2009 (9pgs).
G. Hinton et al., "Deep neural networks for acoustic modeling in speech recognition," IEEE Signal Processing Magazine, Nov. 29:82-97, 2012 (27pgs).
S. Hochreiter et al., "Long short-term memory," Neural Computation, 9(8):1735-1780, 1997 (32pgs).
A. Krizhevsky et al., "Imagenet classification with deep convolutional neural networks," In Advances in Neural Information Processing Systems 25, pp. 1106-1114, 2012 (9pgs).
D. Bahdanau et al., "End-to-end attention-based large vocabulary speech recognition." abs/1508.04395, 2015. http://arxiv.org/abs/1508.04395 (8pgs).
J. Barker et al., The third 'CHiME' speech separation and recognition challenge: Dataset, task and baselines. 2015. Submitted to IEEE 2015 Automatic Speech Recognition and Understanding Workshop (ASRU) (9pgs).

(56) References Cited

OTHER PUBLICATIONS

W. Chan et al., "Listen, attend, and spell," abs/1508.01211, 2015, http://arxiv.org/absZ1508.01211 (16pgs).
Nritten Opinion dated Feb. 7, 2017, in International Patent Application No. PCT/US16/63641, filed Nov. 23, 2016 (7 pgs).
R. Raina et al., "Large-scale deep unsupervised learning using graphics processors," In 26th International Conference on Machine Learning, 2009 (8pgs).
S. Renals et al., "Connectionist probability estimators in HMM speech recognition," IEEE Transactions on Speech and Audio Processing, 2(1):161-174, 1994 (13pgs).
Laurent et al., "Batch Normalized Recurrent Neural Networks," Oct. 5, 2015, URL<https:/larxiv.org/pdf/1510.01378.pdf>, (9 pgs).
Sapp et al., "A Fast Data Collection and Augmentation Procedure for Object Recognition," Proc of the 23rd AAAI Conf on Artificial Intelligence, 2008 (7pgs).
Schuster et al., "Bidirectional Recurrent Neural Networks," IEEE Transactions on Signal Processing, 45(11):2673-2681, Nov. 1997, 1053-587X/97 (9pgs).
Seide et al., "Feature Engineering in Context-Dependent Deep Neural Networks for Conversational Speech Transcription," 978-1-4673-0367-5/11, IEEE, 2011 (6pgs).
Soltau et al.,"Joint Training of Convolutional and Non-Convolutional Neural Networks," 2014 IEEE Int'l Conf on Acoustic, Speech & Signal Processing (5pgs).
Sutskever et al., "On the importance of initialization and momentum in deep learning," Proc of the 30th Int'l Con on Machine Learning, Atlanta, GA, 2013. (14pgs).
Sutskever et al., "Sequence to Sequence Learning with Neural Networks," Google, Inc., Mountain View, CA, 2014 (9pgs).
Szegedy et al., "Going deeper with convolutions," Google, Inc., Mountain View, CA, University of North Carolina, Chapel Hill, and University of Michigan, 2014 (12pgs).
Vesely et al., "Sequence-disciminitive training of deep neural networks," Brno Univeristy of Technology, University of Edinburgh, Johns Hopkins Univeristy, 2013 (5pgs).
A. Waibel et al., "Phoneme recognition using time-delay neural networks,âA'l acoustics speech and signal processing," IEEE Transactions on Acoustics, Speech and Signal Processing, 37(3):328-339, 1989 (12pgs).
R. Williams et al., "An efficient gradient-based algorithm for online training of recurrent network trajectories," Neural computation, 2:490-501, 1990 (12pgs).
T. Yoshioka et al., "The ntt chime-3 system: Advances in speech enhancement and recognition for mobile multi-microphone devices," In IEEE ASRU, 2015 (1pg).
W. Zaremba et al., "Learning to execute," abs/1410.4615, 2014, http://arxiv.org/absZ1410.4615 (8pgs).
Graves et al., "Towards End-to-End Speech Recognition with Recurrent Neural Networks," in Proceedings of the 31st International Conference on Machine Learning, 2014 (9pgs).
M. Schuster et al., "Bidirectional recurrent neural networks," IEEE Transactions on Signal Processing, 45(11):2673-2681, 1997 (9pgs).
F. Seide et al., "Conversational speech transcription using context-dependent deep neural networks," In Interspeech, pp. 437-440, 2011 (4pgs).
J. Shan et al., "Search by voice in mandarin Chinese," In Interspeech, 2010 (5pgs).

H. Soltau et al., "Joint training of convolutional and non-convolutional neural networks," In ICASSP, 2014 (5pgs).
I. Sutskever et al., "On the importance of momentum and initialization in deep learning," In 30th International Conference on Machine Learning, 2013 (14pgs).
I. Sutskever et al., "Sequence to sequence learning with neural networks," 2014, http://arxiv.org/abs/1409.3215 (9pgs).
C. Szegedy et al., "Batch normalization: Accelerating deep network training by reducing internal covariate shift," abs/1502.03167, 2015, http://arxiv.org/abs/1502.03167,11pgs.
C. Szegedy et al., "Going deeper with convolutions," 2014 (9pgs).
R. Thakur et al., "Optimization of collective communication operations in mpich," International Journal of High Performance Computing Applications, 19:49-66, 2005 (17pgs).
K. Vesely et al., "Sequence-discriminative training of deep neural networks," In Interspeech, 2013 (5pgs).
Ellis et al.,"Size Matters: An Empirical Study of Neural Network Training for Large Vocabulary Continuous Speech Recognition," Int'l Computer Science Institute & University of CA at Berkeley, EECS Department,1999. (4pgs).
Glorot et al., "Deep Sparse Rectifier Neural Networks," Appearing in Proceedings of the 14th International Conference on Artificial Intelligence and Statistics (AISTATS), Fort Lauderdale, FL, vol. 15 of JMLR:W&CP 15, 2011 (9pgs).
Graves, "Connectionist Temporal Classification: Labelling Unsegmented Sequence Data with Recurrent Neural Networks," Appearing in Proc of the 23rd International Conference on Machine Learning,, Pittsburgh, PA, 2006 (8pgs).
Graves et al., "Towards End-to-End Speech Recognition with Recurrent Neural Networks," Proc of the 31st Int'l Con on Machine Learning, 2014. JMLR: W&CP vol. 32 (9pgs).
Grosse et al., "Shift-Invariant Sparse Coding for Audio Classification," arXiv preprint arXiv:1206.5241, 2012. (10pgs).
Hannun et al., "First-Pass Large Vocabulary Continuous Speech Recognition using Bi-Directional Recurrent DNNs," Stanford University, 2014 (7pgs).
Heafield et al., "Scalable Modified Kneser-Ney Language Model Estimation," University of Edinburgh, Carnegie Mellon University, and Yandex, 2013 (7pgs).
Chilimbi et al., Project adam: Building an efficient and scalable deep learning training system. In USENIX Symposium on Operating Systems Design and Implementation,2014, 13pg.
K. Cho et al., Learning phrase representations using rnn encoder-decoder for statistical machine translation. In EMNLP, 2014 (15pgs).
J. Chorowski et al., End-to-end continuous speech recognition using attention-based recurrent nn: First results, abs/1412.1602, 2015. http://arxiv.org/abs/1412.1602 (10pgs).
C. Cieri et al., The Fisher corpus: a resource for the next generations of speech-totext. In LREC, vol. 4, pp. 69-71, 2004 (3pgs).
A. Coates et al., "Text detection and character recognition in scene images with unsupervised feature learning," In International Conferenceon Document Analysis and Recognition, 2011 (6pgs).
A. Coates et al., "Deep learning with COTS HPC," In International Conference on Machine Learning, 2013 (9pgs).
G. Dahl et al., Large vocabulary continuous speech recognition with context-dependent DBN-HMMs. In Proc. ICASSP, 2011 (4pgs).
G. Dahl et al., "Context-dependent pre-trained deep neural networks for large vocabulary speech recognition," IEEE Transactions on Audio, Speech, and Language Processing, 2011 (13pgs).

\* cited by examiner
‡ imported from a related application

400

Ensembling a set of neural network models, wherein issues of time shifts between neural network models is addressed using one or more of the factors comprising:

(a) using neural network models that exhibit the same temporal shift; — 405

(b) shifting the inputs into the various models to have aligned outputs; and — 410

(c) checking alignment between output of models and shifting one or more of the outputs to align the outputs. — 415

- 505: Obtain from the model a predicted character output, $\mathbb{P}(c_t|x)$, for an utterance, $x$
- 510: Given the model output $\mathbb{P}(c|x)$, perform a search to find the sequence of characters (e.g., $c_1, c_2, ...$) that is most probable according to both the model output and a language model that interprets the string of characters as words

Incorporate one or more optimizations comprising:
(a) one or more data parallelisms;
(b) model parallelism; and
(c) striding the input into the first layer of the model ⟵ 605

Having each processing unit process many examples in parallel by concatenating many examples into a single matrix; and/or — 705

Sort examples by length and combine similarly-sized utterances into minibatches and pad examples with silence so that all utterances in a minibatch have the same length — 710

FIG. 7A

Use several copies of the model across multiple processing units with each processing unit processing a separate minibatch of examples — 715

Combine a processing unit's computed gradient with its peers during each iteration — 720

Assign a first half of the time-series (e.g., from $t = 1$ to $t = 0.5T^{(i)}$) to a first processing unit and compute the forward activations
&
Assign a second half of the time-series (e.g., from $t = T^{(i)}$ to $t = 0.5\ T^{(i)}$) to a second processing unit and compute the backward activations  — 805

At $0.5T^{(i)}$, the first and second processing units exchange activations and swap roles  — 810

The first processing unit finishes the backward computation and the second processing unit finishes the forward computation  — 815

Stride, by a predetermined step size of $q$ time slices, the input spectrograms at the first layer of the model — 905

FIG. 9

DEEP LEARNING MODELS FOR SPEECH RECOGNITION

CROSS-REFERENCE TO RELATED APPLICATION

This patent application is a divisional of and claims the priority benefit of co-pending and commonly-owned U.S. Pat. No. 10,540,957, issued on Jan. 21, 2020, entitled "SYSTEMS AND METHODS FOR SPEECH TRANSCRIPTION," which patent document is incorporated by reference herein in its entirety and for all purposes.

This application claims the priority benefit under 35 USC § 119(e) to commonly assigned and U.S. Patent Application No. 62/092,251, filed on 15 Dec. 2014, entitled "DEEP SPEECH: SCALING UP END-TO-END SPEECH RECOGNITION," and listing Awni Hannun, Carl Case, Jared Casper, Bryan Catanzaro, Greg Diamos, Erich Elsen, Ryan Prenger, Sanjeev Satheesh, Shubho Sengupta, Adam Coates, and Andrew Y. Ng as inventors. The aforementioned patent document is incorporated by reference herein in its entirety.

This application also claims the priority benefit under 35 USC § 119(e) to commonly assigned and U.S. Patent Application No. 62/093,057, filed on 17 Dec. 2014, entitled "DEEP SPEECH: SCALING UP END-TO-END SPEECH RECOGNITION," and listing Awni Hannun, Carl Case, Jared Casper, Bryan Catanzaro, Greg Diamos, Erich Elsen, Ryan Prenger, Sanjeev Satheesh, Shubho Sengupta, Adam Coates, and Andrew Y. Ng as inventors. The aforementioned patent document is incorporated by reference herein in its entirety.

A. TECHNICAL FIELD

The present disclosure relates to data processing. More particularly, the present disclosure relates to systems and methods for improving the transcription of speech into text.

B. DESCRIPTION OF THE RELATED ART

Computing devices have become increasingly more prevalent. Computing devices are used in diverse ways, in diverse settings, and appear in diverse form factors. For example, computing devices are used in appliances (such as televisions, refrigerators, and thermostats) and in mobile devices (such as smart phones and tablets), and in wearable devices (such as smart watches).

The ever-expanding form factors and uses of computing devices have also led to finding better ways to interface with these devices. Interface issues are particularly acute when dealing with computing devices that have limited space or limited input/output abilities.

Also, regardless of the device's interface capabilities, there is always a need for improved interfaces. Making easier or more natural interfaces can provide a significant competitive advantage. One interface area that has undergone increased attention is the area of speech recognition.

Top speech recognition systems typically rely on sophisticated pipelines composed of multiple algorithms and hand-engineered processing stages. Traditional speech systems use many heavily engineered processing stages, including specialized input features, acoustic models, and Hidden Markov Models (HMMs). To improve these pipelines, domain experts generally invest a great deal of effort tuning their features and models. The introduction of deep learning algorithms has improved speech system performance, usually by improving acoustic models. While this improvement has been significant, deep learning still plays only a limited role in traditional speech pipelines. As a result, to improve performance on a task such as recognizing speech in a noisy environment, one must laboriously engineer the rest of the system for robustness.

Accordingly, what is needed are systems and methods that provide improved speech-to-text conversion.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4 depicts methods for ensembling a set of neural network models according to embodiments of the present invention.

FIG. 5 depicts a method for constraining output of a model using a language model according to embodiments of the present invention.

FIG. 6 depicts methods for improving performance of a model according to embodiments of the present invention.

FIGS. 7A & 7B depict methods for data parallelization according to embodiments of the present invention.

FIG. 8 depicts methods for model parallelization according to embodiments of the present invention.

FIG. 9 depicts a method for striding data according to embodiments of the present invention.

DETAILED DESCRIPTION OF THE PREFERRED EMBODIMENTS

Figure 1:
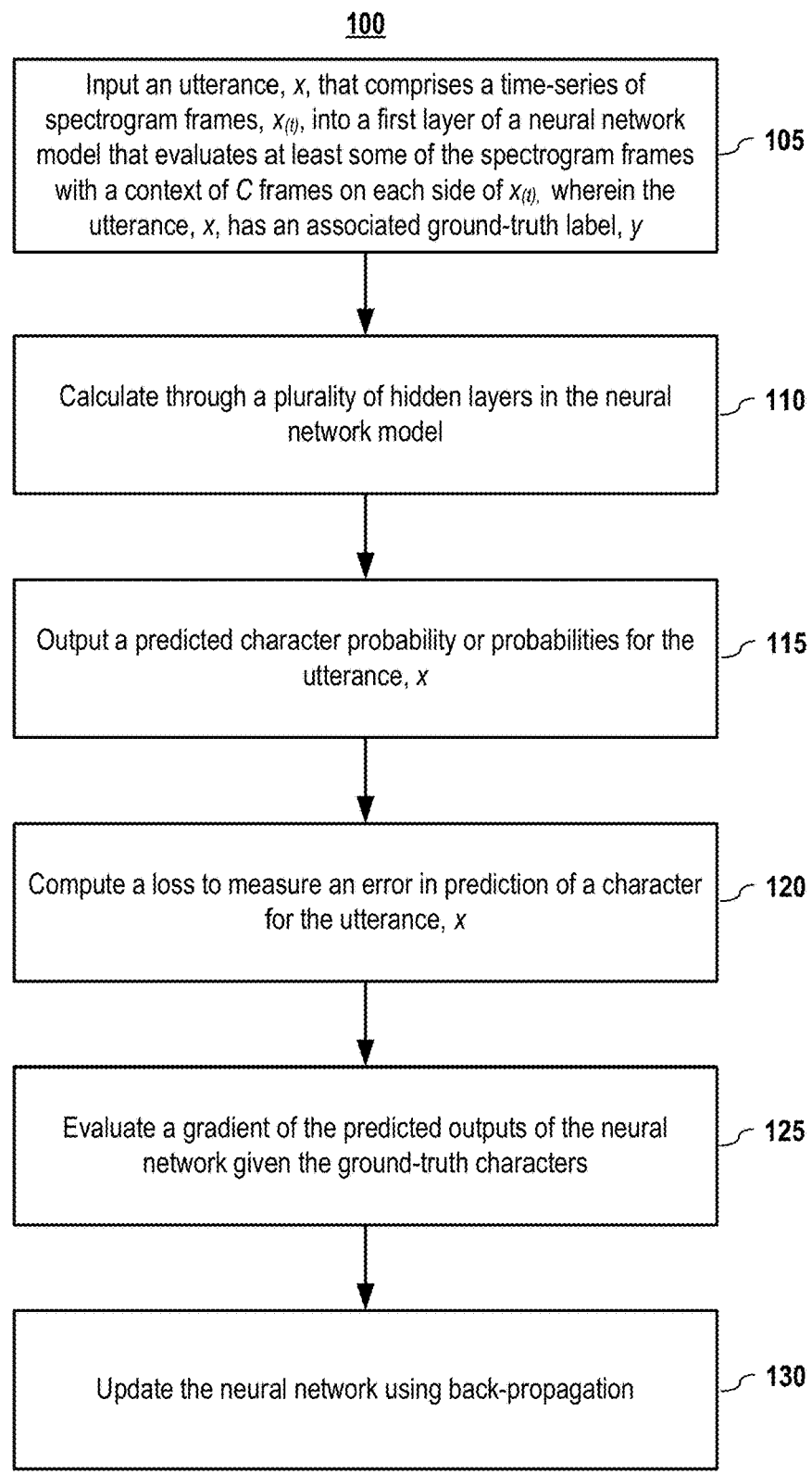
FIG. 1 depicts methods for training a model or set of models according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments. Furthermore, the use of certain terms in various places in the specification is for illustration and should not be construed as limiting. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. Introduction

Presented herein are embodiments of an end-to-end speech systems, which may be referred to herein as "DeepSpeech," where deep learning supersedes the multiple algorithms and hand-engineered processing stages of prior approaches. In embodiments, this approach, combined with a language model, achieves higher performance than traditional methods on hard speech recognition tasks while also being much simpler. In embodiments, these results may be achieved by training a large recurrent neural network (RNN) using multiple graphics processing units (GPUs) and thousands of hours of data. Because embodiments of this system learn directly from data, specialized components for speaker adaptation or noise filtering are not required. In fact, in settings where robustness to speaker variation and noise are critical, embodiments of the present invention excels: as discussed further herein, DeepSpeech outperforms previously published methods on the Switchboard Hub5'00 corpus, achieving 16.5% error, and performs better than commercial systems in noisy speech recognition tests.

It should be noted that tapping the benefits of end-to-end deep learning, however, poses several challenges: (i) innovative ways were found to build large, labeled training sets, and (ii) ways were found to train networks that were large enough to effectively utilize all of this data. One challenge for handling labeled data in speech systems is finding the alignment of text transcripts with input speech. This problem has been previously addressed, thus enabling neural networks to easily consume unaligned, transcribed audio during training. Meanwhile, approaches for rapid training of large neural networks have been suggested, demonstrating the speed advantages of multi-GPU computation. In embodiments, these insights are leveraged to fulfill the vision of a generic learning system, based on large speech datasets and scalable RNN training, that can surpass more complicated traditional methods. This vision is inspired partly by the work that applied early unsupervised feature learning techniques to replace hand-built speech features.

In embodiments, a recurrent neural network (RNN) model was developed specifically to map well to GPUs. And, in embodiments, a novel model partition scheme may be employed to improve parallelization. Additionally, in embodiments, processes were developed for assembling large quantities of labeled speech data exhibiting the distortions that systems should learn to handle. Using a combination of collected and synthesized data, embodiments of systems disclosed herein learned robustness to realistic noise and speaker variation (including Lombard Effect). These ideas built into embodiments of an end-to-end speech system yielded a system that is at once simpler than traditional pipelines yet also performs better on difficult speech tasks. An embodiment of the DeepSpeech system achieved an error rate of 16.5% on the full Switchboard Hub5'00 test set—the best published result. Further, on a new noisy speech recognition dataset of the inventors' own construction, an embodiment of the DeepSpeech system achieved a word error rate of 19.1%, where the best commercial systems achieved 30.5% error.

Presented herein are embodiments of novel speech recognition systems and novel methods for training and for using the systems. Presented below are, first, embodiments of a recurrent neural network model and training framework, followed by a discussion of embodiments of optimizations, and embodiments of data capture and synthesis. Finally, usage and experimental results are presented that demonstrate the state-of-the-art performance of embodiments of a DeepSpeech system.

B. Recurrent Neural Network (RNN) Training

In embodiments, a recurrent neural network (RNN) is trained to ingest speech spectrograms and generate English text transcriptions. Let a single utterance x and label y be sampled from a training set:

$$X=\{(x^{(1)},y^{(1)}),(x^{(2)},y^{(2)}),\ldots\}.$$

Each utterance, $x^{(i)}$, is a time-series of length $T^{(i)}$ where every time-slice is a vector of audio features, $x_t^{(i)}$, $t=1,\ldots,T^{(i)}$. In embodiments, spectrograms may be used as features, so $x_{t,p}^{(i)}$ denotes the power of the p'th frequency bin in the audio frame at time t. In embodiments, a goal of the RNN is to convert an input sequence x into a sequence of character probabilities for the $\mathbb{P}$ transcription y, with $\hat{y}_t = \mathbb{P}(c_t|x)$, wherein $c_t \in \{a, b, c, \ldots, z, \text{space, apostrophe, blank}\}$.

FIG. 1 depicts methods for training a model or set of models according to embodiments of the present invention. In embodiments, an utterance, x, that comprises a time-series of spectrogram frames, $x_{(t)}$, is inputted (105) into a first layer of a recurrent neural network (RNN) model that evaluates at least some of the spectrogram frames with a context of C frames, wherein the utterance, x, has an associated ground-truth label, y.

In embodiments, the RNN model may comprise five (5) layers of hidden units. For an input x, the hidden units at layer l are denoted $h^{(l)}$ with the convention that $h^{(0)}$ is the input. In embodiments, the first three layers are not recurrent. For the first layer, at each time t, the output depends on the spectrogram frame $x_t$ along with a context of C frames, which may be a context from one side or both sides. It shall be noted that, in embodiments, if the spectrogram frame $x_t$ is at the edge of the clip, the context may be from one side or may have data added to the missing side. In embodiments, the context of frames may be $C \in \{5, 7, 9\}$, although other numbers of frames may be used.

In embodiments, the RNN model calculates (110) through a plurality of hidden layers. For example, in embodiments, the remaining non-recurrent layers operate on independent data for each time step. Thus, for each time t, the first three (3) layers are computed by:

$$h_t^{(l)} = g(W^{(l)} h_t^{(l-1)} + b^{(l)})$$

where $g(z) = \min\{\max\{0, z\}, 20\}$ is the clipped rectified-linear (ReLu) activation function and $W^{(l)}$, $b^{(l)}$ are the weight matrix and bias parameters for layer l, respectively. It shall be noted that other activation functions may be employed. In embodiments, the ReLu units are clipped to keep the activations in the recurrent layer from exploding; in practice the units rarely saturate at the upper bound.

In embodiments, the fourth layer is a bi-directional recurrent network. In embodiments, this layer includes two sets of hidden units: a set with forward recurrence, $h^{(f)}$, and a set with backward recurrence $h^{(b)}$:

$$h_t^{(f)} = g(W^{(4)} h_t^{(3)} + W_r^{(f)} h_{t-1}^{(f)} + b^{(4)})$$

$$h_t^{(b)} = g(W^{(4)} h_t^{(3)} + W_r^{(b)} h_{t+1}^{(b)} + b^{(4)})$$

Note that, in embodiments, $h^{(f)}$ is computed sequentially from t=1 to $t=T^{(i)}$ for the i'th utterance, while the units $h^{(b)}$ is computed sequentially in reverse from $t=T^{(i)}$ to t=1.

In embodiments, a fifth (non-recurrent) layer takes both the forward and backward units as inputs:

$$h_t^{(5)} = g(W^{(5)} h_t^{(4)} + b^{(5)}), \text{ where } h_t^{(4)} = h_t^{(f)} + h_t^{(b)}.$$

In embodiments, the output layer is a standard softmax function that yields (115) the predicted character probabilities for each time slice t and character k in the alphabet:

$$h_{t,k}^{(6)} = \hat{y}_{t,k} \equiv \mathbb{P}(c_t = k \mid x) = \frac{\exp(w_k^{(6)} h_t^{(5)} + b_k^{(6)})}{\sum_j \exp(w_j^{(6)} h_t^{(5)} + b_j^{(6)})}.$$

Here $W_k^{(6)}$ and $b_k^{(6)}$ denote the k'th column of the weight matrix and k'th bias, respectively.

Once a prediction for $\mathbb{P}(c_t|x)$ has been computed (115), a loss is calculated (120) to measure the error in prediction. In embodiments, a Connectionist Temporal Classification (CTC) loss, $\mathcal{L}(\hat{y}, y)$, may be used to measure the error in prediction, although other error measurement techniques may be employed. During training, the gradient $\nabla \mathcal{L}(\hat{y}, y)$ is evaluated (125) with respect to the network outputs given the ground-truth character sequence y. From this point, computing the gradient with respect to all of the model parameters may be done via back-propagation (130) through the rest of the network. In embodiments, Nesterov's Accelerated gradient method may be used for training, although other techniques may be employed. In embodiments, a momentum of 0.99 may be used and anneal the learning rate by a constant factor, chosen to yield the fastest convergence, after each epoch through the data.

Figure 2:
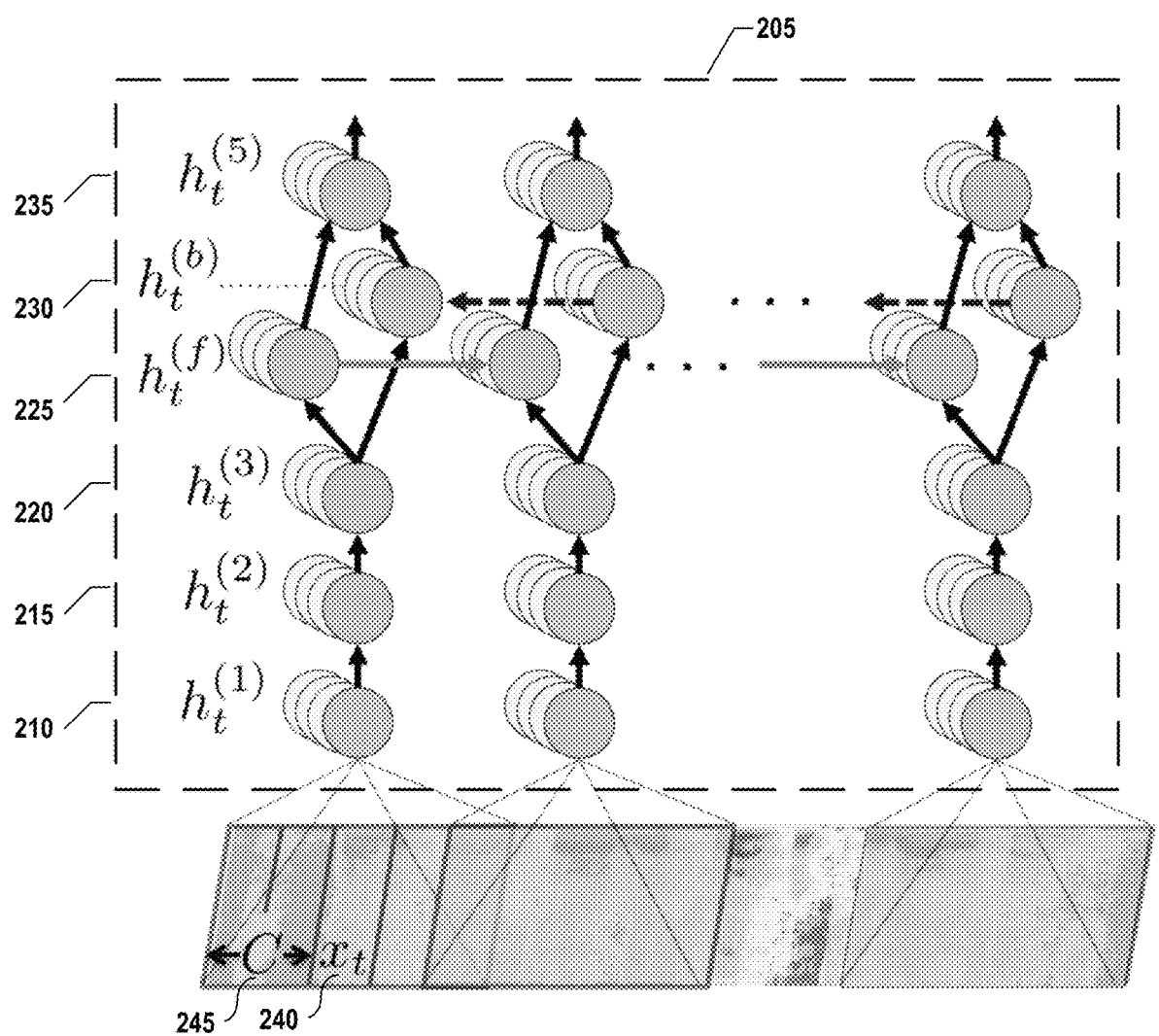
FIG. 2 graphically represents a neural network model according to embodiments of the present invention.

An embodiment of the complete RNN model is illustrated in FIG. 2. As shown in the graphical representation of an embodiment of the RNN model, the model 205 comprises five (5) layers. The first three layers (first layer 210, second layer 215, and third layer 220) are non-recurrent layers, in which the input to the first layer 210 is the spectrogram frames $x_t$ 240 along with a context of C frames (e.g., C 245). The fourth layer 225 & 230 is a bi-directional recurrent network that comprises a set of hidden units with forward recurrence, $h^{(f)}$ 225 and a set of hidden units with backward recurrence, $h^{(b)}$ 230. Finally, as shown in FIG. 2, the fifth layer 235 is a non-recurrent layer that receives as inputs the outputs of both the forward and backward units of the fourth layer 225 & 230, and outputs predicted character probabilities.

It shall be noted that the structure depicted in FIG. 2 is considerably simpler than other models—the depicted embodiment has been limited to a single recurrent layer (which is the hardest to parallelize), and the model does not use Long-Short-Term-Memory (LSTM) circuits.

One disadvantage of LSTM cells is that they require computing and storing multiple gating neuron responses at each step. Since the forward and backward recurrences are sequential, this small additional cost, in embodiments, may become a computational bottleneck. By using a homogeneous model in embodiments, the computation of the recurrent activations are made efficient: computing the ReLU outputs involves only a few highly optimized Basic Linear Algebra Subprograms (BLAS) operations on the GPU and a single point-wise nonlinearity.

1. Regularization

Embodiments of the models were trained using expanded datasets (embodiments of ways to generating datasets and expand datasets are discussed herein in Section 4), yet embodiments of the recurrent networks used herein are still adept at fitting the training data. In embodiments, to reduce variance further, several techniques may be employed. In embodiments, during training, a dropout rate (e.g., 5%) was applied. In embodiments, dropout was applied in the feed-forward layers but not to the recurrent hidden activations.

A commonly employed technique in computer vision during network evaluation is to randomly jitter inputs by translations or reflections, feed each jittered version through the network, and vote or average the results. This is not common in speech recognition, however; it was found that translating the raw audio files by 5 milliseconds (ms) (which represented half the filter bank step size used in embodiments herein) to the left and right, forward propagating the recomputed features, and averaging the results beneficial.

Figure 3:
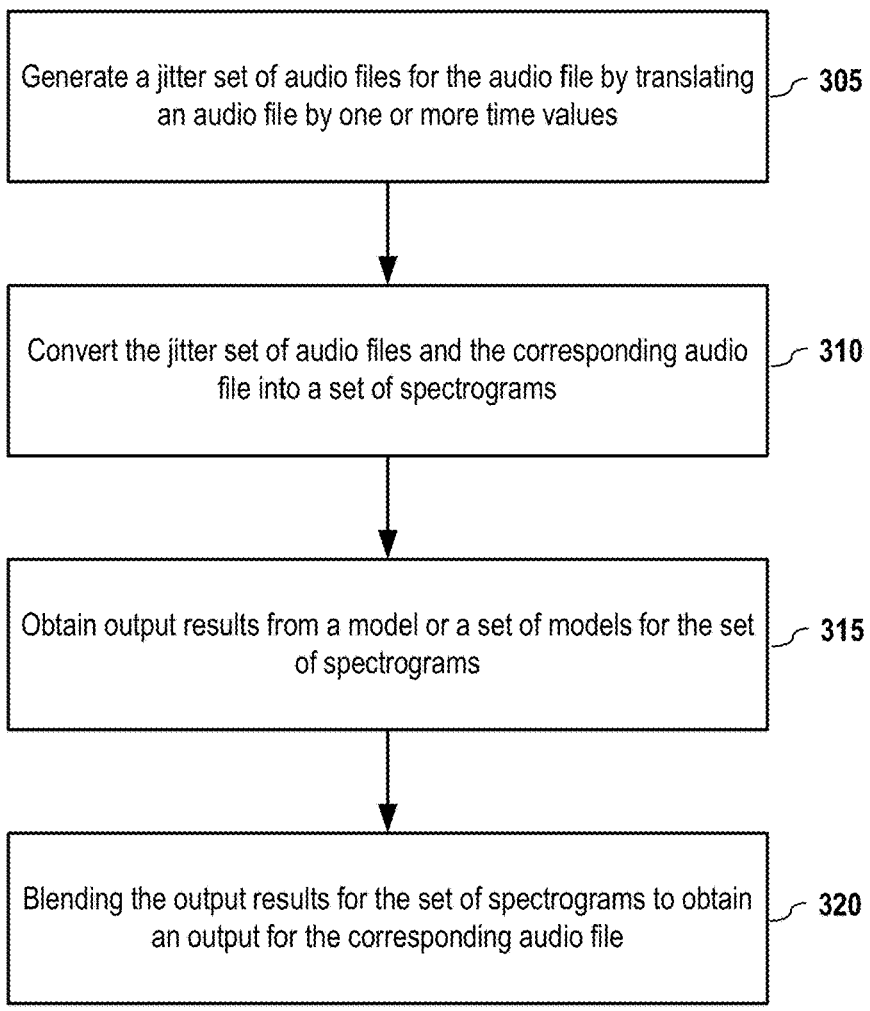
FIG. 3 depicts a method for using jitter samples in training a model according to embodiments of the present invention.

Accordingly, embodiments of the present invention include generating and using jitter sets of audio data. FIG. 3 depicts a method for using jitter samples in training a model according to embodiments of the present invention. In embodiments, a jitter set of audio files for the audio file are generated (305) by translating an audio file by one or more time values. For example, the audio file may be moved by a few milliseconds (e.g., 5 ms) forward and back in time. The jitter set of audio files, including the corresponding original audio file, are converted (310) into a set of spectrograms, which are inputted into a model or set of models. In embodiments, the output results from the model or set of models for the set of spectrograms are obtained (315). The output results for the set of spectrograms are blended (320)

to obtain an output for the corresponding audio file. In embodiments, the blending may be done by averaging (e.g., taking a mean, median, or mode), weighted average, or voting.

In embodiments, at test time, an ensemble of several RNNs, averaging probabilities prior to decoding, may also be used. Using a set of models can achieve better results; however, there can be time shifts between the models. FIG. 4 depicts methods for ensembling a set of neural network models according to embodiments of the present invention. As shown in FIG. 4, issues of time shifts between neural network models when ensembling outputs of a set of neural network models may be addressed using one or more of the following approaches comprising: (a) using (405) neural network models that exhibit the same temporal shift; (b) shifting (410) the inputs into the various models to have aligned outputs; and (c) checking (415) alignment between output of models and shifting one or more of the outputs to align the outputs.

For example, it should be noted that naive averaging of the RNN output probabilities may fail in a subtle way. In embodiments, the CTC loss function is agnostic to small time-shifts of the RNN output, and thus several equally good networks can yield shifted versions of essentially the same output probabilities. In isolation these networks perform well, but averaging the shifted probabilities no longer yields any variance reduction for estimates of $\mathbb{P}(c_t|x)$ and, in fact, usually causes performance to degrade. To resolve this, in embodiments, only models where the onset of the output transcriptions begin at the same time were combined. Though this could be achieved by shifting the outputs manually, enough networks have been trained that a collection with matching shifts is available for experiments.

2. Language Model

When trained from large quantities of labeled speech data, embodiments of the RNN model can learn to produce readable character-level transcriptions. Indeed for many of the transcriptions, the most likely character sequence predicted by embodiments of a trained RNN model is exactly correct without external language constraints. Errors made by the RNN tend to be phonetically plausible renderings of English words—Table 1 shows some examples.

TABLE 1

Examples of transcriptions directly from an embodiment
of a RNN (left) with errors that are fixed by
addition of a language model (right).

| RNN Output | Decoded Transcription |
| --- | --- |
| what is the weather like in bostin right now | what is the weather like in boston right now |
| prime miniter nerenr modi | prime minister narendra modi |
| arther n tickets for the game | are there any tickets for the game |

Many of the errors occur on words that rarely or never appear in the training set. In practice, this is hard to avoid: training from enough speech data to hear all of the words or language constructions that the model might need to know is impractical. Therefore, embodiments of the model include, or are integrated with, a language model. In embodiments, an N-gram language model is used since these models are easily trained from huge unlabeled text corpora. For comparison, while our speech datasets typically include up to 3 million utterances, the N-gram language model used for the experiments in Section 6 is trained from a corpus of 220 million phrases, supporting a vocabulary of 495,000 words.

FIG. 5 depicts a method for constraining output of model using a language model according to embodiments of the present invention. In embodiments, predicted character outputs $\mathbb{P}(c|x)$, for an utterance, x, are obtained (505). Given the output $\mathbb{P}(c|x)$ of the RNN model or models, a search is performed (510) to find the sequence of characters $c_1$, $c_2$, ... that is most probable according to both the RNN output and the language model (where the language model interprets the string of characters as words). In embodiments, the aim is to find a sequence c that maximizes the combined objective:

$$Q(c) = \log(\mathbb{P}(c|x)) + \alpha \log(\mathbb{P}_{lm}(c)) + \beta \text{ word\_count}(c)$$

where α and β are tunable parameters (set by cross-validation) that control the trade-off between the RNN, the language model constraint, and the length of the sentence. The term $\mathbb{P}_{lm}$ denotes the probability of the sequence c according to the N-gram model. In embodiments, this objective is maximized using a beam search algorithm, with a typical beam size in the range 1000-8000.

3. Optimizations

In embodiments, one or more optimization may be employed to speed-up the operation of the model. FIG. 6 depicts methods for improving performance of a model according to embodiments of the present invention. In embodiments, one or more optimizations may be implemented (605) comprising: (a) one or more data parallelisms; (b) model parallelism; and (c) striding the input into the first layer of the model.

As noted previously, embodiments include several design decisions to make the networks amenable to high speed execution, and thus fast training. For example, using homogeneous rectified linear networks that are simple to implement and depend on just a few highly-optimized BLAS calls helps the execution speed. When fully unrolled, embodiment of the networks include almost 5 billion connections for a typical utterance; and thus, efficient computation is important. In embodiments, multi-GPU training may be used but doing this effectively may require some additional work, as explained below.

a) Data Parallelism

In embodiments, to help process data efficiently, two levels of data parallelism may be used. FIGS. 7A & 7B depict methods for data parallelization according to embodiments of the present invention.

First, as depicted in FIG. 7A, each GPU may process (705) many examples in parallel. In embodiments, this may be done by concatenating many examples into a single matrix. For instance, rather than performing a single matrix-vector multiplication $W_r h_t$ in the recurrent layer, many may be done in parallel by computing $W_r H_t$, where $H_t = [h_t^{(i)}, h_t^{(i+1)}, \ldots]$ and where $h_t^{(i)}$ corresponds to the i'th example $x^{(i)}$ at time t. In embodiments, the GPU is most efficient when $H_t$ is relatively wide (e.g., 1000 examples or more), and thus it is preferred to process as many examples on one GPU as possible (e.g., up to the limit of GPU memory).

Second, when it is desired to use larger minibatches than a single GPU can support on its own, data parallelism across multiple GPUs may be used, as illustrated in FIG. 7B.

As shown in FIG. 7B, copies of the model are used (715) on different GPUs, with each GPU processing a separate minibatch of examples. Then, in embodiments, each GPU combines (720) its computed gradient with its peers during each iteration. In embodiments, typically 2× to 4× data parallelism across GPUs were used for experiments by the inventors.

Data parallelism is not easily implemented, however, when utterances have different lengths since they cannot be combined into a single matrix multiplication. In embodiments, this problem was resolved by sorting training examples by length and combining only similarly-sized utterances into minibatches, padding with silence when necessary so that all utterances in a batch have the same length.

b) Model Parallelism

Data parallelism yields training speed-ups for modest multiples of the minibatch size (e.g., 2 to 4), but may face diminishing returns as batching more examples into a single gradient update fails to improve the training convergence rate. That is, processing 2× as many examples on 2× as many GPUs do not always yield a 2× speedup in training. It can also be inefficient to fix the total minibatch size but spread out the examples to 2× as many GPUs: as the minibatch within each GPU shrinks, most operations become memory-bandwidth limited. To scale further, in embodiments, parallelize by partitioning the model ("model parallelism") may be employed.

Some embodiments of the model are challenging to parallelize due to the sequential nature of the recurrent layers. Since the bidirectional layer is comprised of a forward computation and a backward computation that are independent, it is possible to perform the two computations in parallel. Unfortunately, in embodiments, naively splitting the RNN to place $h^{(f)}$ and $h^{(b)}$ on separate GPUs involves significant data transfers when computing $h^{(5)}$, which depends on both $h^{(f)}$ and $h^{(b)}$. Thus, in embodiments, a different partitioning of work may be chosen that requires less communication for the models—the model may be divided in half along the time dimension.

FIG. 8 depicts a method for model parallelization according to embodiments of the present invention. In embodiments, all layers except the recurrent layer may be trivially decomposed along the time dimension, with the first half of the time-series, from $t=1$ to $t=T^{(i)}/2$, assigned to one GPU and the second half to another GPU. In embodiments, when computing the recurrent layer activations, the first GPU begins computing (805) the forward activations $h^{(f)}$, while the second begins computing (805) the backward activations $h^{(b)}$. At the mid-point ($t=T^{(i)}/2$), the two GPUs exchange (810) the intermediate activations, $h_{T/2}^{(f)}$ and $h_{T/2}^{(b)}$ and swap roles. The first GPU then finishes (815) the backward computation of $h^{(b)}$ and the second GPU finishes the forward computation of $h^{(f)}$.

c) Striding

Because the recurrent layers are the hardest to parallelize, embodiments of the present invention may include efforts to reduce the running time of the recurrent layers of embodiments of the RNN by taking "steps" (or strides). FIG. 9 depicts a method for striding data according to embodiments of the present invention.

As shown in FIG. 9, processing time may be shorten for the recurrent layers by taking strides of a step size of q time slices (e.g., step size of 2) in the original input so that the unrolled RNN has fewer steps. This approach is similar to a convolutional network with a step-size of 2 in the first layer. In embodiments, the cuDNN library, which is a set of optimized low-level primitives to boost the processing speed of deep neural networks (DNN) on CUDA®-compatible GPUs made by NVIDIA of Santa Clara, Calif., may be used to implement this first layer of convolution efficiently.

4. Training Data

Large-scale deep learning systems require an abundance of labeled data. For training embodiments of the system, many recorded utterances and corresponding English transcriptions are needed, but there are few public datasets of sufficient scale. To train embodiments of the models, an extensive dataset consisting of 5000 hours of read speech from 9600 speakers was collected. For comparison, Table 2 summarizes the labeled datasets that are available.

TABLE 2

A summary of the datasets used to train embodiment of DeepSpeech. The Wall Street Journal, Switchboard, and Fisher corpora (see, C. Cieri, D. Miller, and K. Walker, "The Fisher corpus: a Resource for the Next Generations of Speech-to-Text," in Language Resources and Evaluation Conference (LREC), volume 4, pages 69-71, 2004, which is incorporated by reference herein in its entirety) are all published by the Linguistic Data Consortium.

| Dataset | Type | Hours | Speakers |
|---|---|---|---|
| WSJ | read | 80 | 280 |
| Switchboard | conversational | 300 | 4000 |
| Fisher | conversational | 2000 | 23000 |
| Baidu | read | 5000 | 9600 |

In embodiments, speech data was recorded from paid volunteers through Amazon Mechanical Turk. Each volunteer ("Turker") was instructed to read a short text prompt into a computer microphone. The recorded speech and matching text transcription were added to a dataset on the server. Since read speech created in this way sounds different from spontaneous speech heard in other contexts, Turkers were instructed to speak as naturally as possible. A separate team of trusted Turkers was occasionally tasked with quality control, verifying that recorded utterances and transcriptions matched. A cap on contributions of volunteers was enforced to ensure that the dataset contained a variety of speakers and was not overwhelmed by a few big contributors. In embodiments, noise was also played through the Turker's computer speakers or headset to induce the Lombard effect, which will be discussed in more detail below.

a) Synthesis by Superposition

In embodiments, to expand the potential training data even further, data synthesis was used. In embodiments, a goal was to improve performance in noisy environments where existing systems breakdown. Capturing labeled data (e.g., read speech) from noisy environments is not practical, however, and thus other ways, which are disclosed herein, were found to generate such data.

To a first order, audio signals are generated through a process of superposition of source signals. This fact was used to synthesize noisy training data. For example, given a speech audio track $x^{(i)}$ and a "noise" audio track $\xi^{(i)}$, then a "noisy speech" track may be formed by $\hat{x}^{(i)} = x^{(i)} + \xi^{(i)}$ to simulate audio captured in a noisy environment. In embodiments, reverberations, echoes, or other forms of damping may be added to the power spectrum of $x^{(i)}$, $\xi^{(i)}$, or both and then added together to make fairly realistic audio scenes.

It should be noted that there are, however, some risks in this approach. For example, in order to take 1000 hours clean speech and create 1000 hours noisy speech, unique noise tracks spanning roughly 1000 hours would normally be needed. It is not preferred to settle for, say, 10 hours of repeating noise, since it may become possible for the recurrent network to memorize the noise track and "subtract" it out of the synthesized data. Thus, instead of using a single noise source $\xi^{(i)}$ with a length of 1000 hours, in embodiments, a large number of shorter clips (which are easier to collect from public video sources) may instead be used and treat them as separate sources of noise before superimposing of them:

$$\hat{x}^{(i)} = x^{(i)} + \xi_1^{(i)} + \xi_2^{(i)} + \ldots$$

Figure 10:
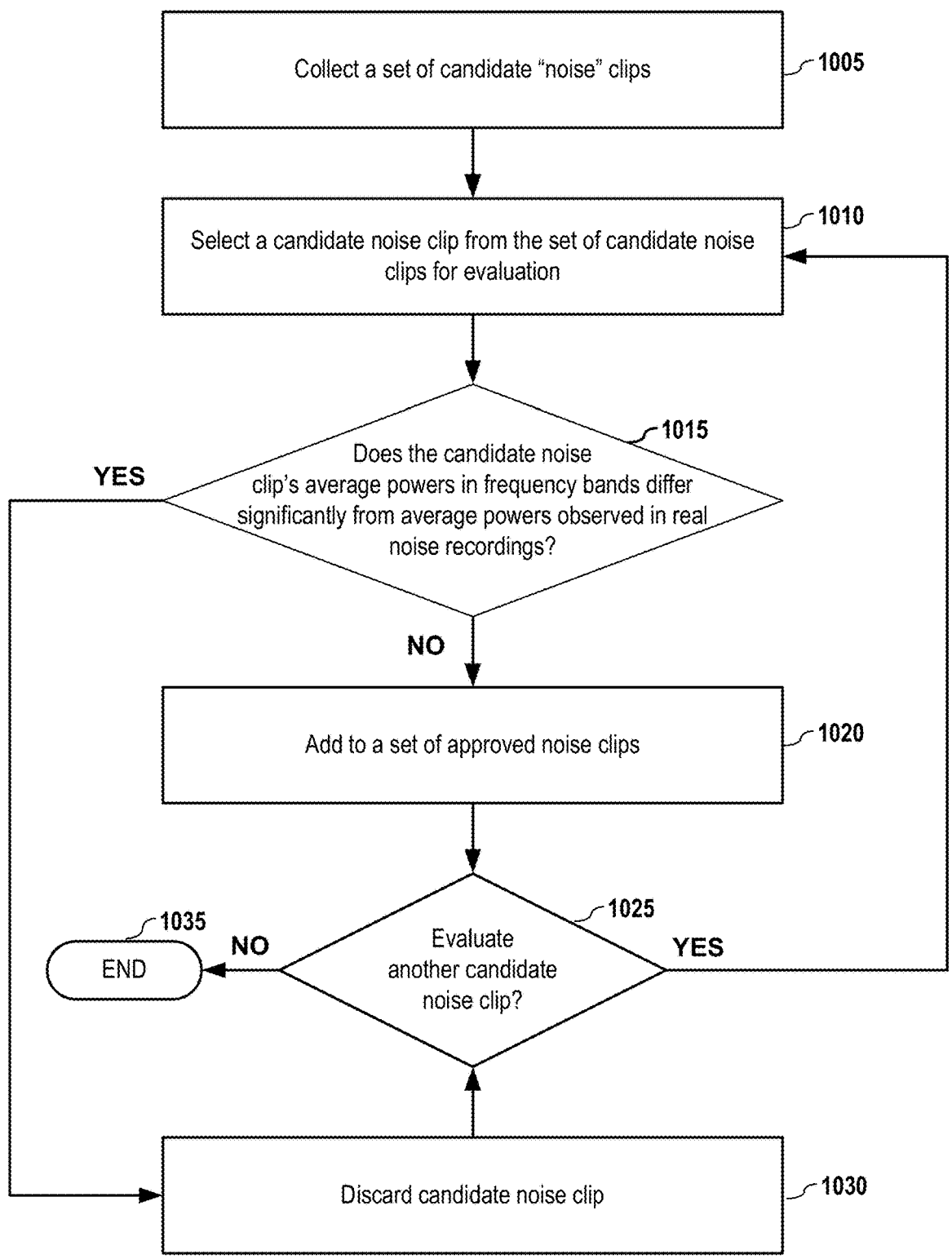
FIG. 10 depicts a method for collecting a set of noise audio clips according to embodiments of the present invention.

FIG. 10 depicts a method for collecting a set of noise audio clips according to embodiments of the present invention. In embodiments, a set of candidate "noise" clips are collected (1005), which may be collected from any of a number of sources, such as the Internet or other datasets. When superimposing many signals collected from audio or video clips, one can end up with "noise" sounds that are different from the kinds of noise recorded in real environments. To ensure a good match between synthetic data and real data, any candidate noise clips where the average power in each frequency band differed significantly from the average power observed in real noisy recordings may be rejected. Thus, in embodiments, a candidate noise clip from the set of candidate noise clips may be selected (1010) for evaluation. A check is made (1015) to determine whether the candidate noise clip's average power in frequency bands differed significantly from average powers observed in real noise recordings. If the candidate noise clip's average powers in frequency bands differ, it is discarded (1030). If the candidate noise clip's average powers in frequency bands do not differ, it is added (1020) to a set of approved noise clips.

In embodiments, a determination is made (1025) whether there are more candidate noise clips to evaluate. If there are one or more candidate noise clips to evaluate, the process (steps 1010-1020) may be repeated. However, if there are not any more candidate noise clips to evaluate, the process ends (1035).

Figure 11:
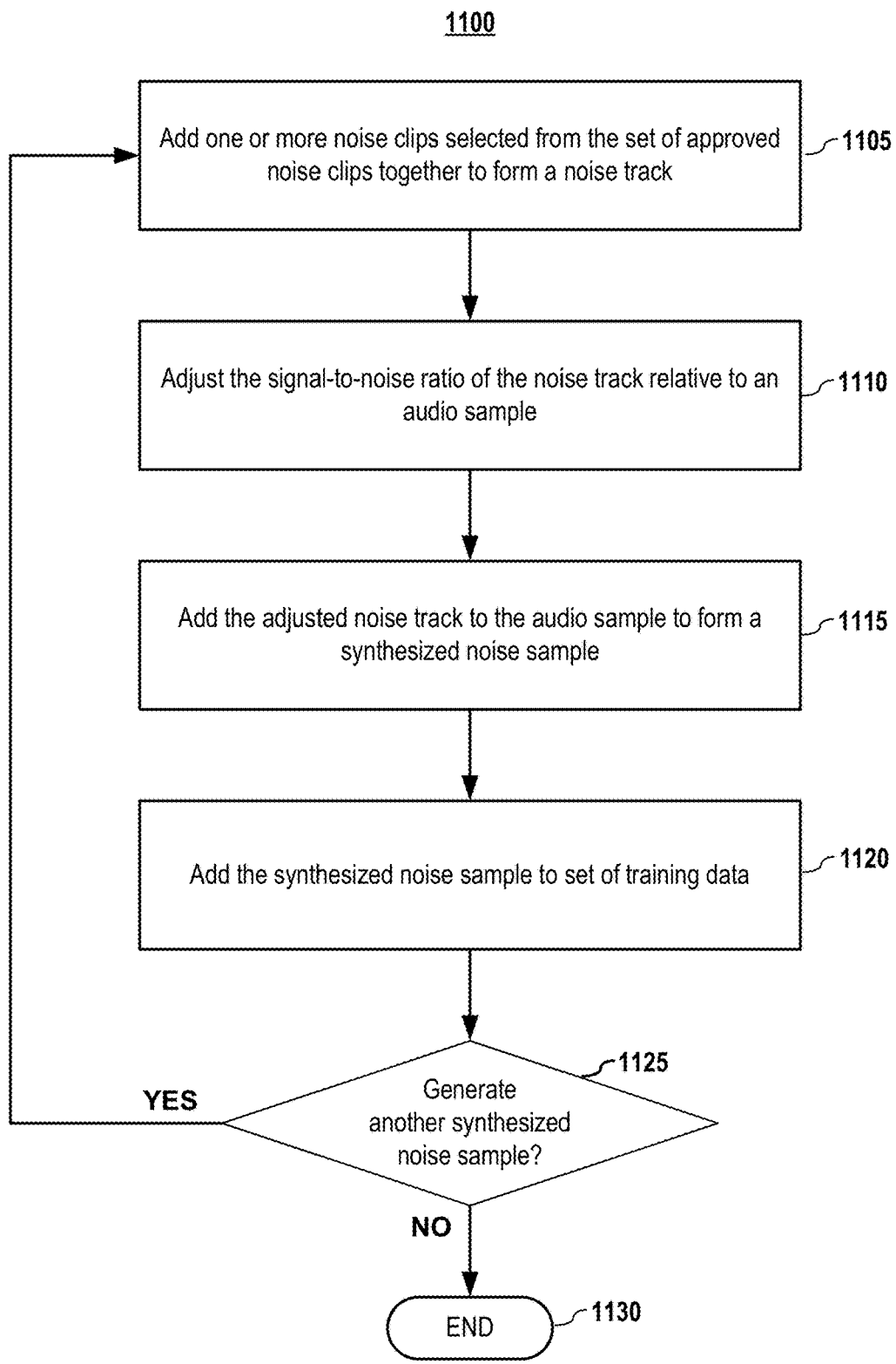
FIG. 11 depicts a method for generating synthesized noise samples according to embodiments of the present invention.

Given the set of approved noise clips, a set of synthesized noise may be generated. FIG. 11 depicts a method for generating synthesized noise samples according to embodiments of the present invention. In embodiments, one or more noise clips selected from the set of approved noise clips may be added (1105) together to form a noise track. In embodiments, the signal-to-noise ratio of the noise track is adjusted (1110) relative to an audio sample. The adjusted noise track is added (1115) to the audio sample to form a synthesized noise sample, and that synthesized noise sample is included (1120) in a set of training data. In embodiments, this process may be repeated (1125) until a satisfactory number of samples have been made, at which point the process ends (1130).

b) Capturing Lombard Effect

Figure 12:
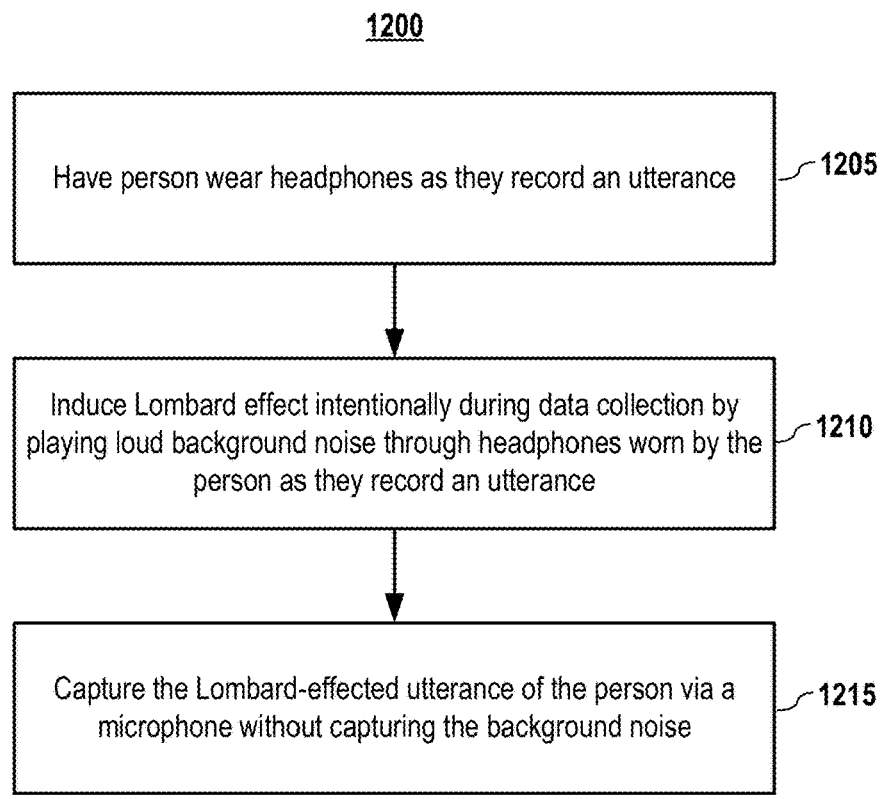
FIG. 12 depicts a method for generating Lombard-effect audio samples according to embodiments of the present invention.

One challenging effect encountered by speech recognition systems in noisy environments is the "Lombard Effect," in which speakers actively change the pitch or inflections of their voice to overcome noise around them. This (involuntary) effect does not show up in recorded speech datasets since they are collected in quiet environments. To ensure that the effect is represented in training data used in embodiments herein, the Lombard effect was intentionally induced during data collection. FIG. 12 depicts a method for generating Lombard-Effect audio samples according to embodiments of the present invention.

As depicted in the FIG. 12, the person recording utterances is instructed to wear (1205) headphones. Then, the Lombard Effect is intentionally induced during data collection by playing (1210) loud background noise through headphones worn by the person as they record an utterance. The noise induces them to inflect their voice, thus allowing for the capture (1215) of the Lombard Effect in training data. It shall be noted that noise may also be played through speakers (and may be subtracted out of the captured audio); however, using headphones has the advantage that "clean" recordings without the background noise included are captures. Have clean recordings allows for other synthetic noise to be added afterwards.

5. Example Methods for Using an Embodiment of a Trained Model

Figure 13:
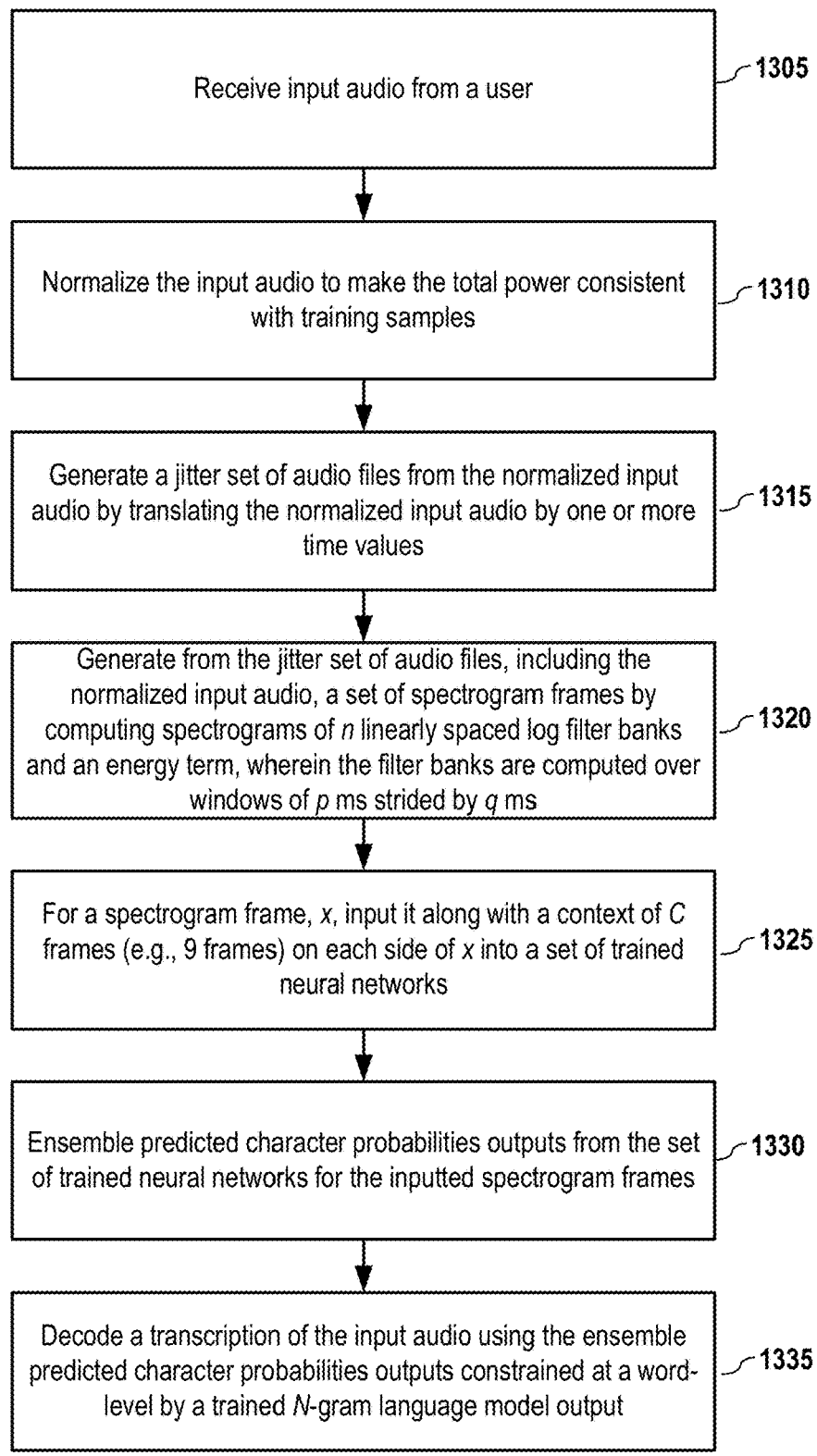
FIG. 13 depicts methods for using a trained model or set of trained models according to embodiments of the present invention.

FIG. 13 depicts methods for using a trained model or set of models according to embodiments of the present invention. In embodiments, an input audio is received (1305) from a user. As depicted in FIG. 13, in embodiments, the input audio may be normalized (1310) to make the total power consistent with training samples that were used to train the model or set of models.

In embodiments, a jitter set of audio files may be generated (1315) from the normalized input audio by translating the normalized input audio by one or more time values. For example, the jitter set of audio files may include the normalized input audio along with an audio file that is shifted by a few milliseconds forward in time and an audio file that is shifted by a few milliseconds backward in time.

In embodiments, a set of spectrogram frames is generated by computing spectrograms of n linearly spaced log filter banks and an energy term from the jitter set of audio files, which includes the normalized input audio. In embodiments, the filter banks are computed over windows of p milliseconds (e.g., 20 ms) strided by q milliseconds (e.g., 10 ms).

In embodiments, each of the spectrogram frame, $x_{(t)}$, from the set of spectrogram frames is inputted (1325) into the trained neural network or networks. In embodiments, a spectrogram frame is input (1325) along with a context of C frames (e.g., 9 frames). The context of frames may be from one side of the spectrogram frame or from both sides.

In embodiments, a plurality of trained neural networks are used and the predicted character probabilities outputs from the set of trained neural networks for the inputted spectrogram frames may be combined (1330), or ensembled, together. Ensembling may be performed using one or more of the methods described above with respect to FIG. 4—although other methods may also be employed.

Finally, in embodiments, a transcription of the input audio is obtained by decoding (1335) the ensemble predicted character probabilities outputs. In embodiments, the decoding processing may comprise using a trained N-gram language model to constrain, at a word level, the decoding of the ensemble predicted character probabilities outputs.

6. Example Experiments

Two sets of experiments were performed to evaluate embodiments of the model system. In both cases, an embodiment of the model as described in Section B was trained from a selection of the datasets in Table 2 to predict character-level transcriptions. The predicted probability vectors and language model were then fed into a decoder to yield a word-level transcription, which was compared with the ground truth transcription to yield the word error rate (WER). It shall be noted that these experiments and results are provided by way of illustration and were performed under specific conditions using an embodiment of the present invention; accordingly, neither these experiments nor their results shall be used to limit the scope of the present invention.

a) Conversational Speech: Switchboard Hub5'00 (Full)

To compare an embodiment system of the present invention (which may be referred to herein as the DeepSpeech embodiment, DeepSpeech model, DeepSpeech network, DeepSpeech system, or simply, DeepSpeech) to prior research, an accepted but highly challenging test set, Hub5'00 (LDC2002S23), was used. Some researchers split this set into "easy" (Switchboard) and "hard" (CallHome) instances, often reporting new results on the easier portion alone. In the experiments presented herein, the full set was used, which is the most challenging case and report the overall word error rate.

The DeepSpeech system was trained on only the 300 hour Switchboard conversational telephone speech dataset and trained on both Switchboard (SWB) and Fisher (FSH), a 2000 hour corpus collected in a similar manner as Switchboard. Many researchers evaluate models trained only with 300 hours from Switchboard conversational telephone speech when testing on Hub5'00. In part, this is because training on the full 2000 hour Fisher corpus is computationally difficult. Using the optimization techniques mentioned in Section 3, the DeepSpeech system was able perform a full pass over the 2300 hours of data in just a few hours.

Since the Switchboard and Fisher corpora are distributed at a sample rate of 8 kHz, spectrograms of 80 linearly spaced log filter banks and an energy term were computed. The filter banks were computed over windows of 20 ms strided by 10 ms. More sophisticated features, such as the mel-scale log filter banks or the mel-frequency cepstral coefficients, were not evaluated.

Speaker adaptation can be important to the success of other current automatic speech recognition (ASR) systems, particularly when trained on 300 hour Switchboard. For the models tested on Hub5'00, a simple form of speaker adaptation was applied by normalizing the spectral features on a per speaker basis. Other than this, the input features were not modified in any way.

For decoding, a 4-gram language model with a 30,000 word vocabulary trained on the Fisher and Switchboard transcriptions was used. Hyperparameters for the decoding objective were chosen via cross-validation on a held-out development set.

The tested DeepSpeech SWB model was a network of 5 hidden layers, each with 2048 neurons trained on only 300 hour switchboard. The DeepSpeech SWB+FSH model was an ensemble of 5 RNNs, each with 5 hidden layers of 2304 neurons trained on the full 2300 hour combined corpus. All networks were trained on inputs of +/−9 frames of context.

The results are reported in Table 3. The model from Vesely et al. (DNN-HMM sMBR) used a sequence-based loss function on top of a DNN after using a typical hybrid DNN-HMM system to realign the training set. The performance of this model on the combined Hub5'00 test set was the best previously published result. When trained on the combined 2300 hours of data, the DeepSpeech system improved upon this baseline by 1.9% absolute WER and 10.3% relative. The model from Maas et al. (DNN-HMM FSH) achieved 19.9% WER when trained on the Fisher 2000 hour corpus. That system was built using Kaldi, a state-of-the-art open source speech recognition software. This result was included to demonstrate that DeepSpeech, when trained on a comparable amount of data, is competitive with the best existing ASR systems.

TABLE 3

Published error rates (% WER) on Switchboard dataset splits. The columns labeled "SWB" and "CH" are respectively the easy and hard subsets of Hub5'00.

| Model | SWB | CH | Full |
|---|---|---|---|
| Vesely et al. (GMM-HMM BMMI) [Ref. A] | 18.6 | 33.0 | 25.8 |
| Vesely et al. (DNN-HMM sMBR) [Ref. A] | 12.6 | 24.1 | 18.4 |
| Maas et al. (DNN-HMM SWB) [Ref. B] | 14.6 | 26.3 | 20.5 |
| Maas et al. (DNN-HMM FSH) [Ref. B] | 16.0 | 23.7 | 19.9 |
| Seide et al. (CD-DNN) [Ref. C] | 16.1 | n/a | n/a |
| Kingsbury et al. (DNN-HMM sMBR HF) [Ref. D] | 13.3 | n/a | n/a |
| Sainath et al. (CNN-HMM) [Ref. E] | 11.5 | n/a | n/a |
| DeepSpeech SWB | 20.0 | 31.8 | 25.9 |
| DeepSpeech SWB + FSH | 13.1 | 19.9 | 16.5 |

Ref A: K. Vesely, A. Ghoshal, L. Burget, and D. Povey, "Sequence-Discriminative Training of Deep Neural Networks," in Proc. of Interspeech 2013, Lyon, France, August 2013, pp. 2345-2349 (which is incorporated by reference herein in its entirety).

Ref B: A. L. Maas, A. Y. Hannun, C. T. Lengerich, P. Qi, D. Jurafsky, and A. Y. Ng, "Increasing Deep Neural Network Acoustic Model Size for Large Vocabulary Continuous Speech Recognition," abs/1406.7806, 2014 (available at //arxiv.org/abs/1406.7806) (which is incorporated by reference herein in its entirety).

Ref C: F. Seide, G. Li, X. Chen, D. Yu, "Feature Engineering in Context-Dependent Deep Neural Networks for Conversational Speech Transcription," in Proc. of IEEE Workshop on Automatic Speech Recognition and Understanding (ASRU) (Waikoloa, Hi., USA, 11 Dec. 2011), pp. 24-29 (which is incorporated by reference herein in its entirety).

Ref D: B. Kingsbury, T. N. Sainath, and H. Soltau, "Scalable Minimum Bayes Risk Training of Deep Neural Network Acoustic Models Using Distributed Hessian-free Optimization," in Proc. INTERSPEECH, September 2012 (which is incorporated by reference herein in its entirety).

Ref E: T. N. Sainath, A.-R. Mohamed, B. Kingsbury, and B. Ramabhadran, "Deep convolutional neural networks for LVCSR," in 2013 IEEE International Conference on Acoustics, Speech and Signal Processing (ICASSP), 2013 (which is incorporated by reference herein in its entirety).

b) Noisy Speech

Few standards exist for testing noisy speech performance, so an evaluation set of 100 noisy and 100 noise-free utterances from 10 speakers was constructed. The noise environments included a background radio or TV; washing dishes in a sink; a crowded cafeteria; a restaurant; and inside a car driving in the rain. The utterance text came primarily from web search queries and text messages, as well as news clippings, phone conversations, Internet comments, public speeches, and movie scripts. Precise control over the signal-to-noise ratio (SNR) of the noisy samples was not possible, but the SNR ratio target was between 6 and 2 dB.

For the following experiments, embodiments of the RNNs were trained on all the datasets (more than 7000 hours) listed in Table 2. Since training was for 15 to 20 epochs with newly synthesized noise in each pass, the model learned from over 100,000 hours of novel data. Also, an ensemble of 6 networks, each with 5 hidden layers of 2560 neurons, was used. No form of speaker adaptation was applied to the training or evaluation sets. Training examples were normalized on a per utterance basis in order to make the total power of each example consistent. The features were 160 linearly spaced log filter banks computed over windows of 20 milliseconds strided by 10 milliseconds and an energy term. Audio files were resampled to 16 kHz prior to the featurization. Finally, from each frequency bin the experimenters removed the global mean over the training set and divided by the global standard deviation, primarily so the inputs are well scaled during the early stages of training.

As described in Section B.2, a 5-gram language model was used for the decoding. The language model was trained on 220 million phrases of the Common Crawl (available at commoncrawl.org), selected such that at least 95% of the characters of each phrase were in the alphabet. Only the most common 495,000 words were kept, the rest were remapped to an "UNKNOWN" token.

The trained embodiment of the DeepSpeech system was compared to several commercial speech systems: (1) wit.ai, (2) Google Speech API, (3) Bing Speech, and (4) Apple Dictation. Note that wit.ai and Google Speech each have HTTP-based APIs; to test Apple Dictation and Bing Speech, a kernel extension was used to loop audio output back to audio input and the OS X Dictation service as well as the Windows 8 Bing speech recognition API.

The test was designed to benchmark performance in noisy environments. This situation created challenges for evaluating the web speech APIs: these systems will give no result at all when the SNR is too low or in some cases when the utterance is too long. Therefore, the comparison was restricted to the subset of utterances for which all systems returned a non-empty result. This leads to much higher accuracies than would be reported if 100% error was attributed in cases where an API failed to respond. The results of evaluating each system on the test files appear in Table 4.

TABLE 4

Results (% WER) for 3 systems evaluated on the original audio. All systems were scored only on utterances with predictions given by all systems. The number in parenthesis next to each dataset, e.g. Clean (94), is the number of utterances scored.

| System | Clean (94) | Noisy (83) | Combined (177) |
| --- | --- | --- | --- |
| Apple Dictation | 14.24 | 43.76 | 26.73 |
| Bing Speech | 11.73 | 36.12 | 22.05 |
| Google API | 6.64 | 30.47 | 16.72 |
| wit.ai | 7.94 | 35.06 | 19.41 |
| DeepSpeech | 6.56 | 19.06 | 11.85 |

To evaluate the efficacy of the noise synthesis techniques described in Section B.4, embodiments of two RNNs were trained, one on 5000 hours of raw data and the other trained on the same 5000 hours plus noise. On the 100 clean utterances both models performed about the same, 9.2% WER and 9.0% WER for the clean trained model and the noise trained model, respectively. However, on the 100 noisy utterances the noisy model achieves 22.6% WER over the clean model's 28.7% WER, a 6.1% absolute and 21.3% relative improvement.

c) Conclusion

Several parts of embodiments presented herein expanded upon or were inspired by previous results. Neural network acoustic models and other connectionist approaches were first introduced to speech pipelines in the early 1990s. These systems, similar to deep neural network (DNN) acoustic models, replace only one stage of the speech recognition pipeline. Mechanically, embodiments of the systems presented herein may be considered to include some similarity to other efforts to build end-to-end speech systems from deep learning algorithms. For example, Graves et al. (A. Graves, S. Fernandez, F. Gomez, and J. Schmidhuber, "Connectionist temporal classification: Labelling unsegmented sequence data with recurrent neural networks," in Proceedings of the 23rd International Conference on Machine Learning (ICML), pp. 369-376. ACM (2006), which is incorporated by reference herein in its entirety) previously introduced the "Connectionist Temporal Classification" (CTC) loss function for scoring transcriptions produced by RNNs and, with Long Short-Term Memory (LSTM) networks, previously applied this approach to speech (see, A. Graves and N. Jaitly, "Towards end-to-end speech recognition with recurrent neural networks," in Proceedings of the 31st International Conference on Machine Learning (ICML), pp. 1764-1772, 2014, which is incorporated by reference herein in its entirety). Embodiments presented herein similarly adopt the CTC loss for part of the training procedure but use much simpler recurrent networks with rectified-linear activations. Embodiment of the recurrent network may be considered to include some similarity to the bidirectional RNN used by Hannun et al. (A. Y. Hannun, A. L. Maas, D. Jurafsky, and A. Y. Ng, "First-pass large vocabulary continuous speech recognition using bi-directional recurrent DNNs," in The Computing Research Repository (CoRR) abs/1408.2873, 2014 (available at arxiv.org/abs/1408.2873), which is incorporated by reference herein in its entirety), but with multiple changes to enhance its scalability. By focusing on scalability, it is shown herein that simpler networks can be effective even without the more complex LSTM machinery.

Scalability to improve performance of deep learning (DL) algorithms has been previously considered, and the use of parallel processors (including GPUs) has been used in recent large-scale DL results. Early ports of DL algorithms to GPUs revealed significant speed gains. Researchers have also begun choosing designs that map well to GPU hardware to gain even more efficiency, including convolutional and locally connected networks, especially when optimized libraries like cuDNN (see, S. Chetlur, C. Woolley, P. Vandermersch, J. Cohen, J. Tran, B. Catanzaro, and E. Shelhamer, "cuDNN: Efficient primitives for deep learning," CoRR, abs/1410.0759, 2104 (available at arxiv.org/abs/1410.0759), which is incorporated by reference herein in its entirety) and BLAS are available. Indeed, using high-performance computing infrastructure, it is possible today to train neural networks with more than 10 billion connections using clusters of GPUs. These results inspired at least some of the embodiments herein to be developed by focusing on making scalable design choices to efficiently utilize many GPUs before trying to engineer the algorithms and models themselves.

With the potential to train large models, there is a need for large training sets as well. In other fields, such as computer vision, large labeled training sets have enabled significant leaps in performance as they are used to feed larger and larger DL systems. In speech recognition, however, such large training sets are not common, with typical benchmarks having training sets ranging from tens of hours (e.g., the Wall Street Journal corpus with 80 hours) to several hundreds of hours (e.g. Switchboard and Broadcast News). Larger benchmark datasets, such as the Fisher corpus with 2000 hours of transcribed speech, are rare and only recently being studied. To fully utilize the expressive power of embodiments of the networks described herein, large sets of labeled utterances were not the only datasets that were relied upon, but also synthesis techniques were used to generate novel examples. A similar approach is known in computer vision, but it was found that, when done properly, synthesizing data can be especially convenient and effective for speech training.

It shall be noted that the novel disclosures herein provided novel and significant advances over the prior these approaches. Presented herein are novel systems and methods for creating, training, and using end-to-end deep learning-based speech systems capable of outperforming existing state-of-the-art recognition pipelines in at least two challenging scenarios: clear, conversational speech, and speech in noisy environments. Embodiments include multi-GPU training and also include unique data collection and synthesis strategies to build large training sets exhibiting the distortions systems should be able to handle (such as background noise and Lombard Effect). These solutions allow for the building of a data-driven speech system that is at once better performing than existing methods while no longer relying on the complex processing stages that had stymied further progress.

C. Exemplary Computing System Embodiments

Aspects of the present patent document are directed to a computing system. For purposes of this disclosure, a computing system may include any instrumentality or aggregate of instrumentalities operable to compute, calculate, determine, classify, process, transmit, receive, retrieve, originate, route, store, display, communicate, manifest, detect, record, reproduce, handle, or utilize any form of information, intelligence, or data for business, scientific, control, or other purposes. For example, a computing may be a personal computer (e.g., desktop or laptop), tablet computer, mobile device (e.g., personal digital assistant (PDA) or smart phone), server (e.g., blade server or rack server), a network device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 14:
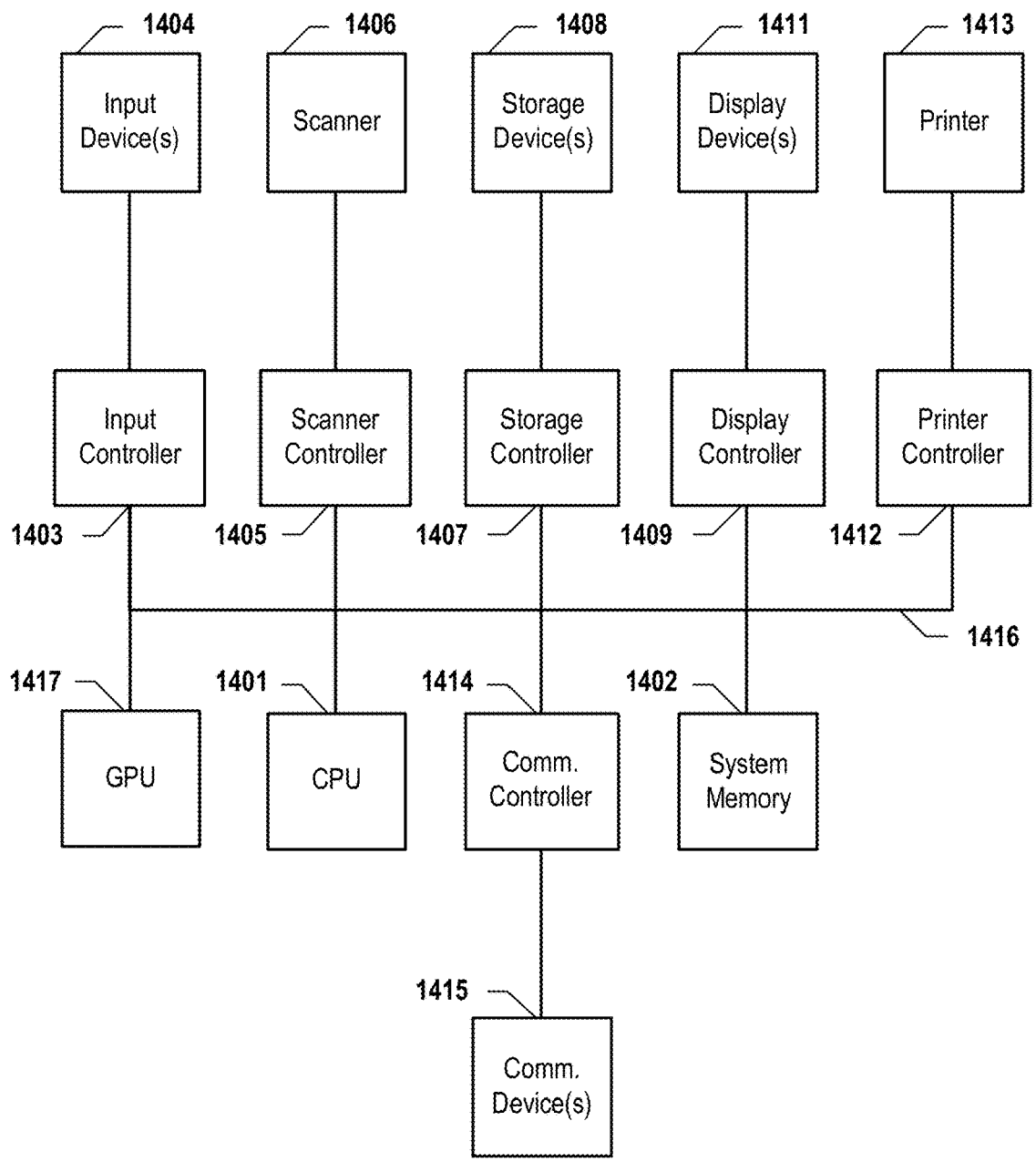
FIG. 14 depicts a simplified block diagram of a computing system according to embodiments of the present invention.

FIG. 14 depicts a block diagram of a computing system 1400 according to embodiments of the present invention. It will be understood that the functionalities shown for system 1400 may operate to support various embodiments of a computing system—although it shall be understood that a computing system may be differently configured and include different components. As illustrated in FIG. 14, system 1400 includes one or more central processing units (CPU) 1401 that provides computing resources and controls the computer. CPU 1401 may be implemented with a microprocessor or the like, and may also include one or more graphics processing units (GPU) 1417 and/or a floating point coprocessor for mathematical computations. System 1400 may also include a system memory 1402, which may be in the form of random-access memory (RAM), read-only memory (ROM), or both.

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. System 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present invention. Storage device(s) 1408 may also be used to store processed data or data to be processed in accordance with the invention. System 1400 may also include a display controller 1409 for providing an interface to a display device 1411, which may be a cathode ray tube (CRT), a thin film transistor (TFT) display, or other type of display. The computing system 1400 may also include a printer controller 1412 for communicating with a printer 1413. A communications controller 1414 may interface with one or more communication devices 1415, which enables system 1400 to connect to remote devices through any of a variety of networks including the Internet, an Ethernet cloud, an Fiber Channel over Ethernet (FcoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for training a transcription neural network, the method comprising:
    inputting an utterance that comprises a set of spectrogram frames covering time steps of the utterance into a first layer of the transcription neural network that evaluates, for each time step of a set of time steps, a spectrogram frame from the set of spectrogram frames and an associated context of one or more spectrogram frames;
    obtaining predicted character probabilities for the utterance from the transcription neural network;
    using the predicted character probabilities for the utterance and a corresponding ground truth transcription for the utterance to determine a loss in predicting the corresponding ground truth transcription for the utterance; and
    updating one or more parameters of the transcription neural network using a gradient based upon the loss in predicating the utterance.

2. The computer-implemented method of claim 1 further comprising:
    jittering the utterances prior to inputting into the transcription neural network.

3. The computer-implemented method of claim 2 wherein the step of jittering the utterances prior to inputting into the transcription neural network comprises:
    generating a jitter set of utterances for the utterance by translating an audio file of the utterance by one or more time values;
    converting the jitter set of utterances and the utterance into a set of spectrograms;
    obtaining output results from the transcription neural network for the set of spectrograms; and
    averaging the output results for the set of spectrograms to obtain an output for the utterance.

4. The computer-implemented method of claim 1 further comprising:
    generating one or more utterances for a set of training data for use in training the transcription neural network.

5. The computer-implemented method of claim 4 wherein generating one or more utterances for a set of training data for use in training the transcription neural network comprises:
    having a person wear headphones as the person records an utterance;
    intentionally inducing a Lombard effect during data collection of the utterance by playing background noise through the headphones worn by the person; and
    capturing the Lombard-effected utterance of the person via a microphone without capturing the background noise.

6. The computer-implemented method of claim 4 wherein generating one or more utterances for a set of training data for use in training the transcription neural network comprises:
    adding one or more noise clips selected from a set of approved noise clips to form a noise track;
    adjusting a signal-to-noise ratio of the noise track relative to an audio file;
    adding the adjusted noise track to the audio file to form a synthesized noise audio file; and
    adding the synthesized noise audio file to the set of training data.

7. The computer-implemented method of claim 6 wherein the set of approved noise clips are generated by performing the steps comprising:
    collecting a set of candidate noise clips; and
    repeating the following steps until each noise clip from the set of candidate noise clips has been evaluated:
        selecting a candidate noise clip from the set of candidate noise clips for evaluation;
        responsive to the candidate noise clip's average powers in frequency bands not differing significantly from average powers in frequency bands observed in real noise recordings, adding the candidate noise clip to the set of approved noise clips; and
        responsive to the candidate noise clip's average powers in frequency bands differing significantly from average powers observed in real noise recordings, discarding the candidate noise clip.

8. The computer-implemented method of claim 1 further comprising using data parallelism by performing the steps comprises:
    using several copies of the transcription neural network across multiple processing units with each processing unit processing a separate minibatch of utterances; and
    combining a computed gradient from a processing unit with its peers during each iteration.

9. The computer-implemented method of claim 1 further comprising using data parallelism by performing the steps comprises:
    having each processing unit process many utterances in parallel by concatenating many utterances into a single matrix; and sorting utterances by length and combining similarly-sized utterances into minibatches and padding utterances with silence so that all utterances in a minibatch have the same length.

10. A computer-implemented method for transcribing speech comprising:
generating a set of spectrogram frames for an input audio;
inputting the set of spectrogram frames into a transcription neural network;
obtaining predicted character probabilities outputs from the transcription neural network; and
decoding a predicted transcription of the input audio using the predicted character probabilities outputs from the transcription neural network constrained by a language model that interprets a string of characters from the predicted character probabilities outputs as a word or words.

11. The computer-implemented method of claim 10 further comprising:
using the predicted transcription for the input audio and a corresponding ground truth transcription for the input audio to determine a loss in predicting the corresponding ground truth transcription for the input audio; and
updating one or more parameters of the transcription neural network using the loss in predicting the corresponding ground truth transcription for the input audio.

12. The computer-implemented method of claim 10 wherein the step of generating a set of spectrogram frames from the input audio comprises:
generating a set of spectrogram frames from a normalized version of the input audio or from a normalized and jitter version of the input audio.

13. The computer-implemented method of claim 10 wherein the step of inputting the set of spectrogram frames into a transcription neural network comprises:
inputting the set of spectrogram frames into the transcription neural network in which at least one layer of the transcription neural network operates on a context of spectrogram frames from the set of spectrogram frames.

14. The computer-implemented method of claim 10 wherein the step of decoding a predicted transcription of the input audio using the predicted character probabilities outputs from the transcription neural network constrained by a language model that interprets a string of characters from the predicted character probabilities outputs as a word or words comprises:
given the predicted character probabilities outputs from the transcription neural network, performing a search to find a sequence of characters that is most probable according to both the predicted character probabilities outputs and an N-gram language model output that interprets a string of characters from the predicted character probabilities outputs as a word or words.

15. The computer-implemented method of claim 10 wherein the transcription neural network comprises:
a first set of three layers that are non-recurrent;
a fourth layer that is a bi-directional recurrent network, which includes two sets of hidden units comprising a set with forward recurrence and a set with backward recurrence; and
a fifth layer that is a non-recurrent layer, which takes forward and backward units from the fourth layer as inputs and outputs the predicted character probabilities.

16. A non-transitory computer-readable medium or media comprising one or more sequences of instructions which, when executed by one or more processors, causes steps to be performed comprising:
generating a set of spectrogram frames for an input audio;
inputting the set of spectrogram frames into a transcription neural network;
obtaining predicted character probabilities outputs from the transcription neural network; and
decoding a predicted transcription of the input audio using the predicted character probabilities outputs from the transcription neural network constrained by a language model that interprets a string of characters from the predicted character probabilities outputs as a word or words.

17. The non-transitory computer-readable medium or media of claim 16 further comprising one or more sequences of instructions which, when executed by one or more processors, causes steps to be performed comprising:
using the predicted transcription for the input audio and a corresponding ground truth transcription for the input audio to determine a loss in predicting the corresponding ground truth transcription for the input audio; and
updating one or more parameters of the transcription neural network using the loss in predicting the corresponding ground truth transcription for the input audio.

18. The non-transitory computer-readable medium or media of claim 16 wherein the step of inputting the set of spectrogram frames into a transcription neural network comprises:
inputting the set of spectrogram frames into the transcription neural network in which at least one layer of the transcription neural network operates on a context of spectrogram frames from the set of spectrogram frames.

19. The non-transitory computer-readable medium or media of claim 16 wherein the step of decoding a predicted transcription of the input audio using the predicted character probabilities outputs from the transcription neural network constrained by a language model that interprets a string of characters from the predicted character probabilities outputs as a word or words comprises:
given the predicted character probabilities outputs from the transcription neural network, performing a search to find a sequence of characters that is most probable according to both the predicted character probabilities outputs and an N-gram language model output that interprets a string of characters from the predicted character probabilities outputs as a word or words.

20. The non-transitory computer-readable medium or media of claim 16 wherein the transcription neural network comprises:
a first set of three layers that are non-recurrent;
a fourth layer that is a bi-directional recurrent network, which includes two sets of hidden units comprising a set with forward recurrence and a set with backward recurrence; and
a fifth layer that is a non-recurrent layer, which takes forward and backward units from the fourth layer as inputs and outputs the predicted character probabilities.

* * * * *